United States Patent

Tsutsui

(10) Patent No.: US 9,235,515 B2
(45) Date of Patent: Jan. 12, 2016

(54) ARRAY CONTROLLER AND STORAGE SYSTEM

(71) Applicant: Semiconductor Energy Laboratory Co., Ltd., Atsugi-shi, Kanagawa-ken (JP)

(72) Inventor: Naoaki Tsutsui, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 295 days.

(21) Appl. No.: 13/803,204

(22) Filed: Mar. 14, 2013

(65) Prior Publication Data

US 2013/0262765 A1 Oct. 3, 2013

(30) Foreign Application Priority Data

Mar. 29, 2012 (JP) ................................. 2012-077834

(51) Int. Cl.
*G06F 17/50* (2006.01)
*G06F 12/08* (2006.01)

(52) U.S. Cl.
CPC ........ *G06F 12/0802* (2013.01); *G06F 12/0866* (2013.01); *G06F 12/0893* (2013.01); *G06F 2212/222* (2013.01); *Y02B 60/1225* (2013.01)

(58) Field of Classification Search
CPC ..................... G06F 17/5045; G06F 2213/0038
USPC ........... 711/114, 151, 154, 161; 716/100, 138
See application file for complete search history.

(56) References Cited

U.S. PATENT DOCUMENTS

| | | | |
|---|---|---|---|
| 4,506,323 A * | 3/1985 | Pusic et al. ..................... | 711/161 |
| 5,731,856 A | 3/1998 | Kim et al. | |
| 5,744,864 A | 4/1998 | Cillessen et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |

(Continued)

FOREIGN PATENT DOCUMENTS

| | | |
|---|---|---|
| EP | 1 737 044 A1 | 12/2006 |
| EP | 2 226 847 A2 | 9/2010 |

(Continued)

OTHER PUBLICATIONS

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

(Continued)

*Primary Examiner* — Paul Dinh
(74) *Attorney, Agent, or Firm* — Fish & Richardson P.C.

(57) ABSTRACT

A storage system which includes a cache memory needless of replacement of a power storage device, a cache memory with low power consumption, or a cache memory having no limitation on the number of writing operations is provided. An array controller for storing data externally input in any of a plurality of storage devices or a storage system including the array controller includes a processor which specifies at least one of the plurality of storage devices where the data is to be stored and a cache memory which stores the data and outputs the data to the at least one of the plurality of storage devices. The cache memory includes a storage circuit in which a transistor including an oxide semiconductor layer is used.

12 Claims, 12 Drawing Sheets

(56) References Cited

U.S. PATENT DOCUMENTS

| | | |
|---|---|---|
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 8,289,753 B2 | 10/2012 | Yamazaki et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0200634 A1 | 9/2006 | Yoshida et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0033433 A1* | 2/2007 | Pecone et al. ............ 714/6 |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0106904 A1* | 4/2010 | Berke et al. ............ 711/114 |
| 2010/0109002 A1 | 5/2010 | Itagaki et al. |
| 2011/0010582 A1 | 1/2011 | Tsukamoto et al. |
| 2011/0202716 A1 | 8/2011 | Nakagawa |
| 2011/0228584 A1 | 9/2011 | Takemura |
| 2012/0054441 A1 | 3/2012 | Nakashima et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2001-344225 A | 12/2001 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-244123 A | 9/2006 |
| JP | 2007-058873 A | 3/2007 |
| JP | 2010-152747 A | 7/2010 |
| JP | 2011-018241 A | 1/2011 |
| JP | 2011-103109 A | 5/2011 |
| JP | 2011-170447 A | 9/2011 |
| JP | 2011-204285 A | 10/2011 |
| JP | 2012-048613 A | 3/2012 |
| WO | 2004/114391 A1 | 12/2004 |

OTHER PUBLICATIONS

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

(56) References Cited

OTHER PUBLICATIONS

Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium—Gallium—Zinc Oxide TFTS and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn—Oxide TFTS," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using Castep," Zeitschrift fur Kristallographie, 2005, vol. 220, pp. 567-570.

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Zn—O TFTS," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTS) for AMLCDS," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YBFE2O4, and YB2FE3O7 Types of Structures for Compounds in the IN2O3 and SC2O3—A2O3—BO Systems [A; Fe, Ga, or Al; B: Mg, Mn, Fe, Ni, Cu,or Zn] at Temperatures Over 1000° C," Journal of Solid State Chemistry, 1985, vol. 60, pp. 382-384.

(56) References Cited

OTHER PUBLICATIONS

Kimizuka, N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits, 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium—Oxide-Based Thin-Film Transistors by DC Sputtering," SID Digest '09 : SID International Symposium Digest of Technical Papers, May 31, 2009, pp. 191-193.

Li, C et al "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "Suftla Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3—Ga2ZnO4—ZnO system at 1350° C," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics), 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters), Sep. 13, 2004, vol. 85, No. 11, pp. 1993-1995.

Nowatari, H et al., "60.2: Intermediate Connector With Suppressed Voltage Loss for White Tandem OLEDS," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In—Ga—Zn—Oxide TFTS With a Novel Passivation Layer," SID Digest '09 : SID International Symposium Digest of Technical Papers, May 31, 2009, pp. 284-287.

\* cited by examiner

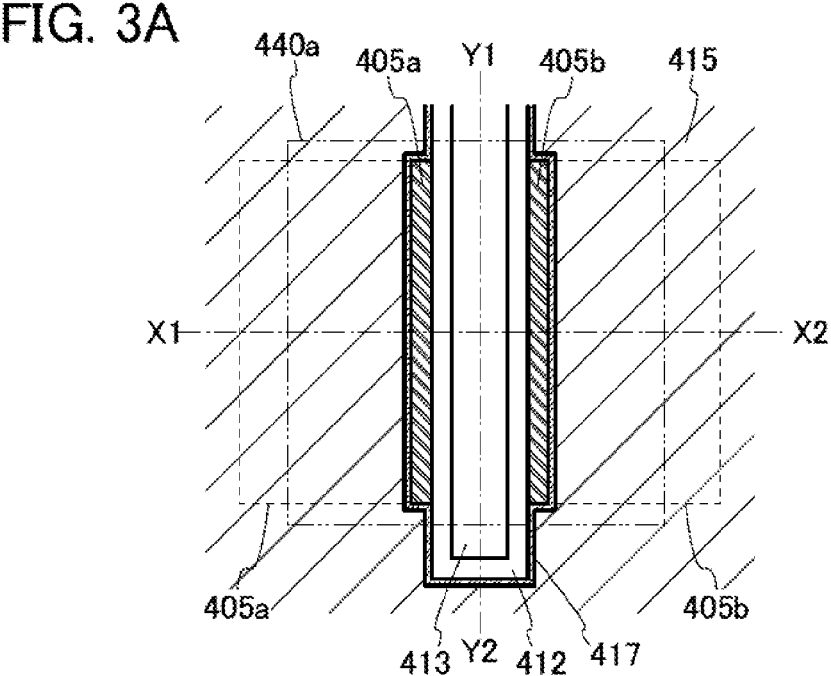
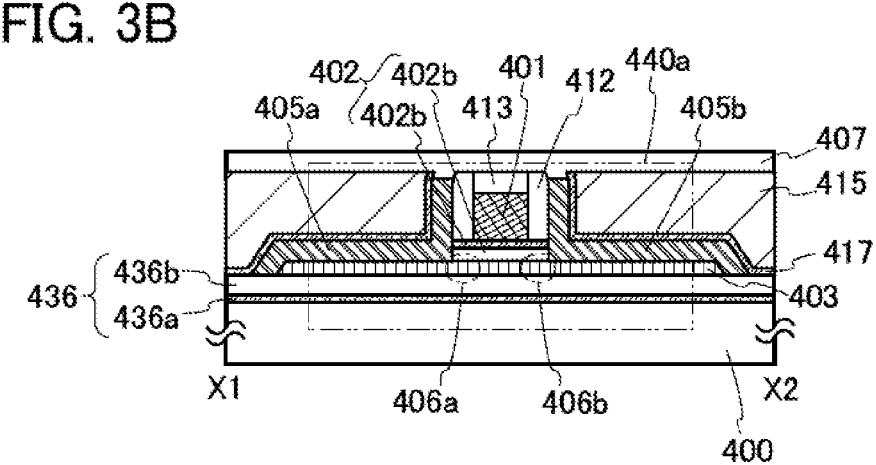
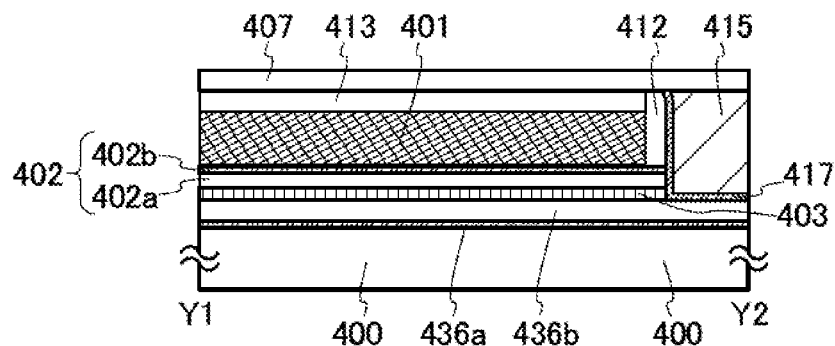

FIG. 9A
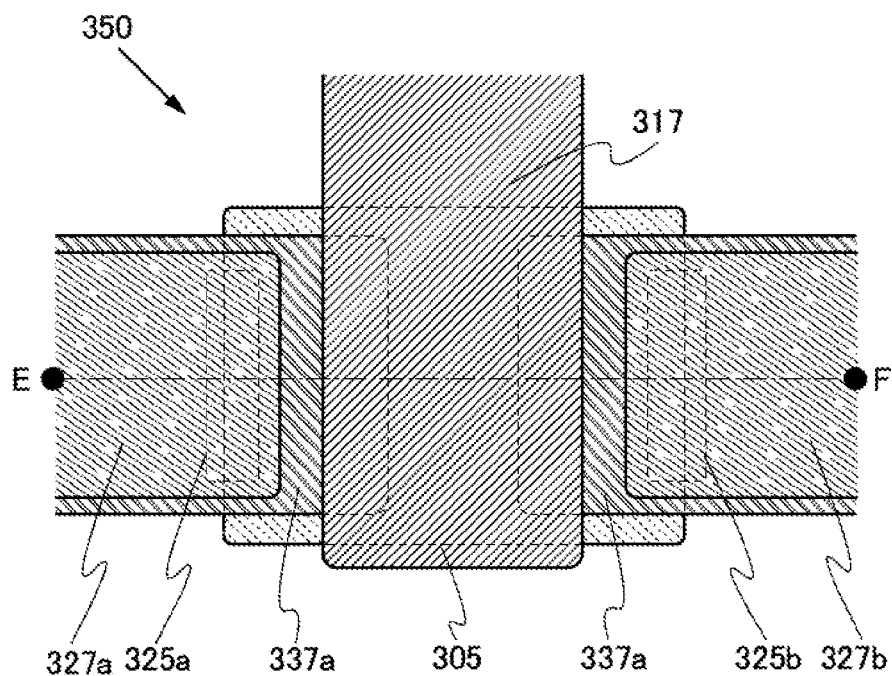
FIG. 9B
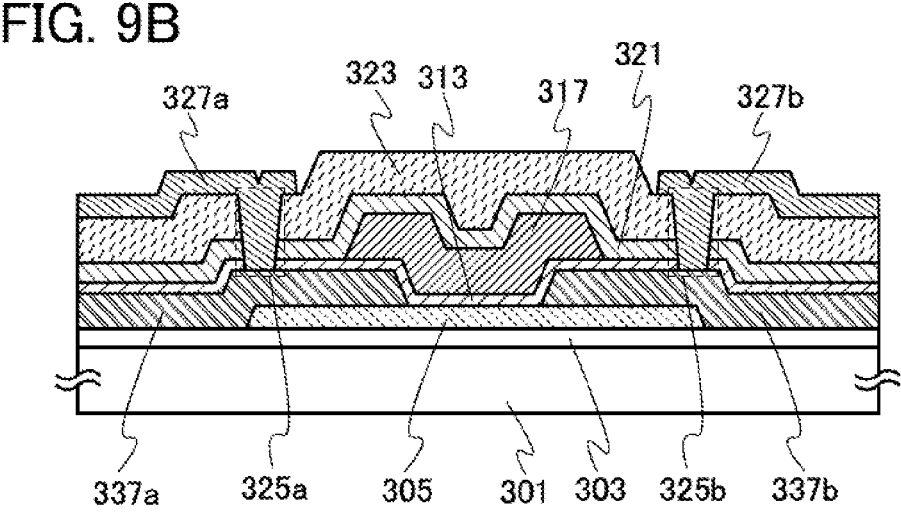

ARRAY CONTROLLER AND STORAGE SYSTEM

BACKGROUND OF THE INVENTION

1. Field of the Invention

The present invention relates to an object, a method, a manufacturing method, a process, a machine, manufacture, or a composition of matter. In particular, the present invention relates to, for example, a semiconductor device, a display device, a light-emitting device, a driving method thereof, or a manufacturing method thereof. Specifically, the present invention relates to an array controller and a storage system.

2. Description of the Related Art

In recent years, storage systems including a plurality of mass storage devices such as hard disks (hard disk drives (HDDs)) have been widely used. In general, a storage system includes a plurality of storage devices and a controller for controlling access to these storage devices (array controller or disk array controller).

Examples of such a storage system including a mass storage device are a JBOD (just a bunch of disks) system and an RAID (redundant array of inexpensive disks or redundant array of independent disks) system.

A storage system, which is required to have high reliability, is provided with a cache system for securing data coherency in the case of a system stop due to power failure or the like (see Patent Document 1, Patent Document 2, Patent Document 3, and Patent Document 4).

Securement of data coherency and protection of data in the case of a system stop due to power failure or the like are important factors in enhancing the reliability and availability (capability of a system to operate continuously) of storage. For example, when a system is stopped, data whose writing is not completed is stored in (backed up to) a cache system which operates at high speed, so that the data stored in the cache system can be read out when the system is recovered (restarted); thus, incoherency of data in the case of a system stop can be prevented.

A specific example of such a cache system is a system in which a volatile memory, such as a dynamic random access memory (DRAM), is used as a cache memory and a power storage device for a cache memory is used. A DRAM stores data in such a manner that a transistor included in a storage element is selected and electric charge is accumulated in a capacitor. Since data stored in a DRAM is lost when power supply is stopped, a power storage device for a cache memory is needed for securing power supply in the case of power failure.

Instead of using a DRAM and a power storage device, a nonvolatile memory, such as a flash memory, can be used for a cache system for securement of data coherency and protection of data in the case of power failure.

A flash memory includes a floating gate between a gate electrode and a channel formation region in a transistor and stores data by holding charge in the floating gate. Therefore, a flash memory has advantages in that the data holding period is extremely long (semi-permanent) and refresh operation which is necessary to a volatile memory is not needed.

REFERENCE

Patent Document

[Patent Document 1] Japanese Published Patent Application No. 2001-344225

[Patent Document 2] Japanese Published Patent Application No. 2011-103109

[Patent Document 3] Japanese Published Patent Application No. 2011-18241

[Patent Document 4] Japanese Published Patent Application No. 2012-48613

SUMMARY OF THE INVENTION

However, in a cache system using a DRAM and a power storage device, replacement of the power storage device requires a stop of a storage system. Such replacement of a power storage device accompanied by a stop of a storage system might degrade the availability of the storage system.

Moreover, in a cache system using a DRAM, a transistor included in a storage element has leakage current and electric charge flows into or out of a capacitor even when the transistor is in a non-selected state (also referred to as an off state); thus, the DRAM has a short data holding period. For that reason, another writing operation (refresh operation) is necessary at predetermined intervals, and it is difficult to sufficiently reduce power consumption.

In a cache system using a flash memory, a gate insulating layer included in a storage element deteriorates owing to tunneling current generated in writing, so that the storage element stops its function after a predetermined number of writing operations. That is, a flash memory has an upper limit on the number of writing operations.

In order to reduce adverse effects of this problem, a method in which the number of writing operations for storage elements is equalized is employed, for example. However, a complicated peripheral circuit is needed to realize this method. Moreover, employing such a method does not solve the fundamental problem of lifetime. In other words, a flash memory is not suitable for applications in which data is frequently rewritten, such as a storage system.

In addition, high voltage is necessary for injection of electric charge to the floating gate or removal of the electric charge, and a circuit for generating high voltage is also necessary. Moreover, it takes a relatively long time to inject or remove charge, and it is not easy to increase the speed of writing or erasing data.

In view of the above, an object of one embodiment of the invention disclosed herein is to provide a storage system which includes a cache memory needless of replacement of a power storage device.

Another object of one embodiment of the invention disclosed herein is to provide a storage system which includes a cache memory with low power consumption.

Another object of one embodiment of the invention disclosed herein is to provide a storage system which includes a cache memory having no limitation on the number of rewriting operations.

Note that the description of these objects does not impede the existence of other objects. Note that in one embodiment of the present invention, there is no need to achieve all the objects. Other objects will be apparent from and can be derived from the description of the specification, the drawings, the claims, and the like.

One embodiment of the invention disclosed herein provides a storage system which includes, as a cache memory, a storage device in which a transistor including an oxide semiconductor (hereinafter referred to as an oxide semiconductor transistor) is used.

In an oxide semiconductor transistor, leakage current between a source and a drain in an off state (hereinafter referred to as off-state current) per micrometer of a channel width is 100 zA ($1\times10^{-19}$ A) or lower, preferably 10 zA ($1\times10^{-20}$ A) or lower, further preferably 1 zA ($1\times10^{-21}$ A) or lower at an operating temperature (e.g., at 25° C.). More specifically, the off-state current means drain current in the off state, for example, drain current when a potential difference between the source and a gate is equal to or lower than the threshold voltage.

As described above, the oxide semiconductor transistor has a characteristic of extremely low off-state current. Thus, when the oxide semiconductor transistor is in an off state, electric charge of a node which is electrically connected to one of the source and the drain of the oxide semiconductor transistor can be held for a long time. In the case where electric charge of a node is held as data in a storage circuit including such an oxide semiconductor transistor with extremely low off-state current, the storage circuit can hold the data for a long time. In other words, it can be said that a storage circuit including such an oxide semiconductor transistor with extremely low off-state current is practically a nonvolatile storage device (memory).

In the case where a storage device including an oxide semiconductor transistor is used as a cache memory, power supply is not needed when the oxide semiconductor transistor is in an off state, which removes the necessity of always supplying power to the cache memory. Thus, a storage system which includes a cache memory needless of replacement of a power storage device can be provided.

Further, as described above, another writing operation (refresh operation) at predetermined intervals may be conducted at a far longer interval or may be unnecessary in the case of a storage device including an oxide semiconductor transistor. Thus, a storage system which includes a cache memory with low power consumption can be provided. Note that the storage device with such a long refresh interval (one hour or more, for example) or the refresh-free storage device can store data for a specified period (one hour or more, for example) even after an unexpected power failure or unexpected system stop occurs. Thus, a storage system with a cache memory including storage devices using oxide semiconductor transistors can restart without any loss of data stored in the cache memory and the data are input to hard disks or the like after recovering from the power failure or the system stop, so that the operation before the power failure or the system stop can be continued, In a memory including an oxide semiconductor transistor, a gate insulating layer of a storage element does not deteriorate as in a flash memory, which removes the upper limit on the number of writing operations. Thus, by using a memory including an oxide semiconductor transistor as a cache memory, a storage system which has no limitation on the number of writing operations can be provided.

One embodiment of the invention disclosed herein relates to an array controller for storing data externally input in any of a plurality of storage devices. The array controller includes a processor which specifies at least one of the plurality of storage devices where the data is to be stored and a cache memory which stores the data and outputs the data to the at least one of the plurality of storage devices. The cache memory includes a storage circuit in which a transistor including an oxide semiconductor layer is used.

One embodiment of the invention disclosed herein relates to a storage system including a plurality of storage devices and an array controller for storing data externally input in any of the plurality of storage devices. The array controller includes a processor which specifies at least one of the plurality of storage devices where the data is to be stored and a cache memory which stores the data and outputs the data to the at least one of the plurality of storage devices. The cache memory includes a storage circuit in which a transistor including an oxide semiconductor layer is used.

In one embodiment of the invention disclosed herein, the cache memory includes a first transistor including the oxide semiconductor layer, a second transistor including a semiconductor layer having a band gap different from that of the oxide semiconductor layer, and a capacitor electrically connected to the first transistor and the second transistor.

According to one embodiment of the invention disclosed herein, a storage system which includes a cache memory needless of replacement of a power storage device can be provided.

According to one embodiment of the invention disclosed herein, a storage system which includes a cache memory with low power consumption can be provided.

According to one embodiment of the invention disclosed herein, a storage system which includes a cache memory having no limitation on the number of rewriting operations can be provided.

BRIEF DESCRIPTION OF THE DRAWINGS

FIGS. 3A to 3C are a plan view and cross-sectional views illustrating an oxide semiconductor transistor.

FIGS. 9A and 9B are a plan view and a cross-sectional view of an oxide semiconductor transistor.

DETAILED DESCRIPTION OF THE INVENTION

Figure 1A:
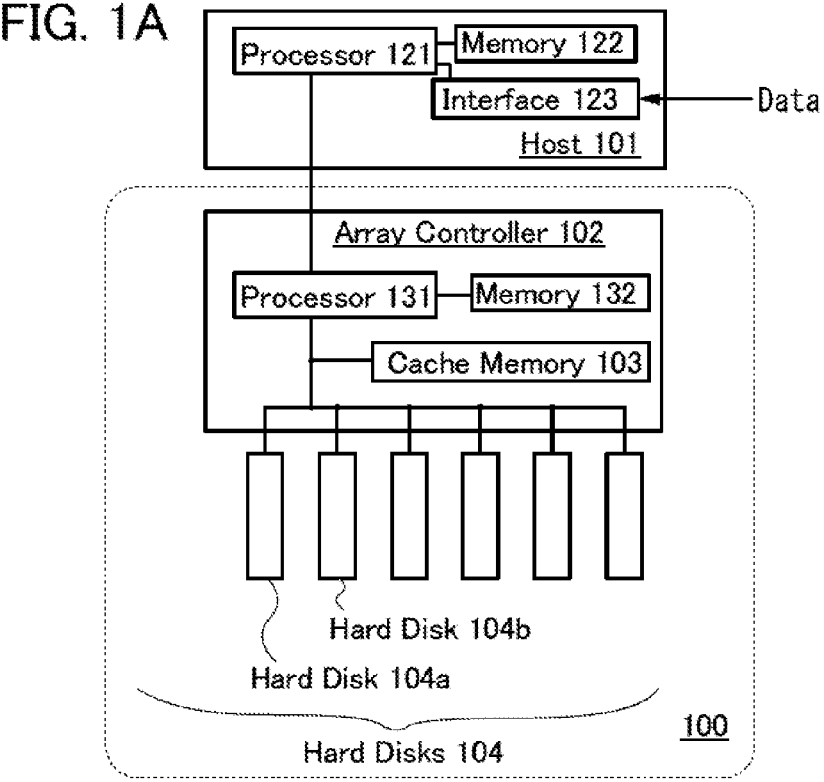
FIGS. 1A and 1B each illustrate a storage system.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments. Note that, in the drawings hereinafter shown, the same portions or portions having similar functions are denoted by the same reference numerals, and repeated description thereof will be omitted. Further, in some cases, the same hatching patterns are applied to similar parts, and the similar parts are not necessarily designated by reference numerals.

Note that in the invention disclosed in this specification, a semiconductor device refers to an element or a device which functions by utilizing a semiconductor and includes, in its category, an electronic device including an electronic circuit, a display device, a light-emitting device, a storage device, and the like and electronic equipment on which the electronic device is mounted.

Note that the position, size, range, or the like of each structure shown in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

In addition, in this specification and the like, the term such as "electrode" or "wiring" does not limit a function of a component. For example, an "electrode" is sometimes used as part of a "wiring", and vice versa. Furthermore, the term "electrode" or "wiring" can include the case where a plurality of "electrodes" or "wirings" is formed in an integrated manner.

Functions of a "source" and a "drain" are sometimes replaced with each other when a transistor of opposite polarity is used or when the direction of current flowing is changed in circuit operation, for example. Therefore, the terms "source" and "drain" can be used to denote the drain and the source, respectively, in this specification.

Note that in this specification and the like, the term "electrically connected" includes the case where components are connected through an object having any electric function. There is no particular limitation on an object having any electric function as long as electric signals can be transmitted and received between components that are connected through the object. Examples of an "object having any electric function" are a switching element such as a transistor, a resistor, an inductor, a capacitor, and an element with a variety of functions as well as an electrode and a wiring.

In this specification and the like, the term "substantially equal" concerning thickness means "almost equal" as well as "completely equal". For example, "substantially equal" refers to a case where, as compared to the "completely equal" thickness situation, there is a difference in thickness that causes a negligible influence on semiconductor device characteristics (a case where the influence on characteristics is 5% or less), a case where the thickness is slightly reduced by polishing without intention (a case where the polishing amount is approximately less than 5 nm), and the like.

Note that in this specification and the like, the term such as "over" or "below" does not necessarily mean that a component is placed "directly on" or "directly under" another component. For example, the expression "a gate electrode over a gate insulating film" can mean the case where there is an additional component between the gate insulating film and the gate electrode.

<Configuration of Storage System>

Figure 1B:
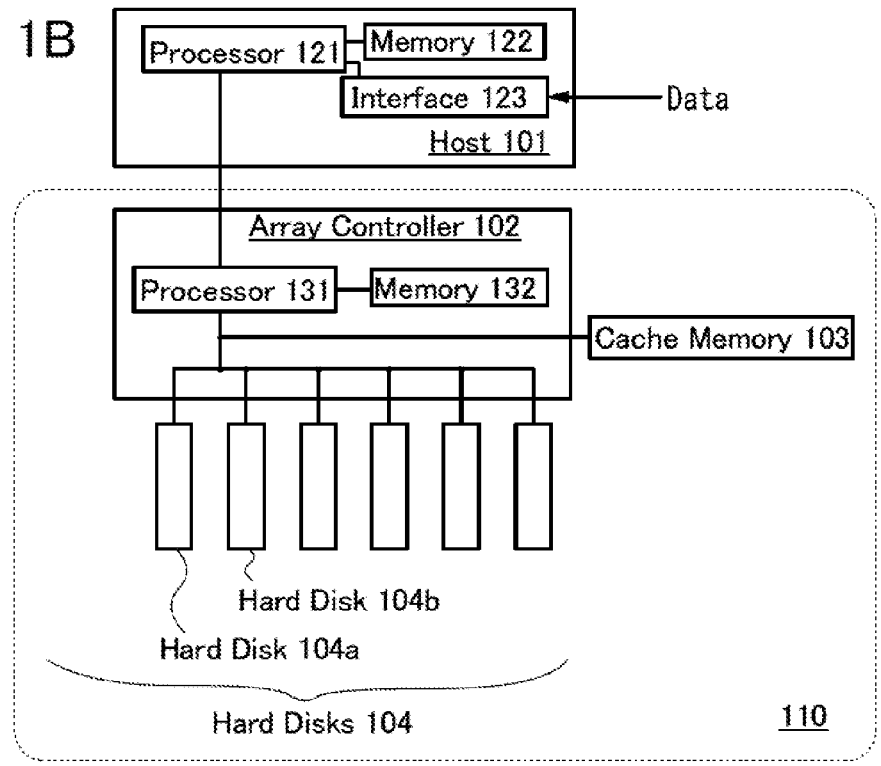

FIGS. 1A and 1B each illustrate a configuration of a storage system of this embodiment. A storage system 100 in FIG. 1A includes an array controller 102 and hard disks 104 (typified by the hard disk 104a and the hard disk 104b), which are mass storage devices. In the storage system 100 in FIG. 1A, the array controller 102 is electrically connected to a host computer (hereinafter referred to as a host) 101. Note that an RAID (redundant array of inexpensive disks or redundant array of independent disks) system is used as the storage system of this embodiment. RAID is a technique of managing a plurality of hard disks collectively as a single hard disk.

The host 101 includes a processor 121, a memory 122, and an interface 123. The processor 121 of the host 101 is a device which controls another device and processes data. The processor 121 of the host 101 executes a program stored in the memory 122. The processor 121 of the host 101 receives data from the other device through the interface 123 and processes the data. The processed data is output to the other device through the interface 123. Note that more than one host 101 may be provided.

The memory 122 has a function of storing a program to be executed by the processor 121 and a function of holding data while the processor 121 performs processing. As the memory 122, it is possible to use the above-described storage device including an oxide semiconductor transistor (the details are described later) or a storage device in which a memory including an oxide semiconductor transistor and a DRAM are used in combination.

The processed data is input to the hard disks 104 from the host 101 through the array controller 102. At this time, the processed data is first stored in a cache memory 103 of the array controller 102.

The array controller 102 includes a processor 131, a memory 132, and the cache memory 103. The array controller (also referred to as an array controller) 102 controls a plurality of storage devices (the hard disks 104 in this embodiment) as logically one storage device and controls the manner in which data input from the host 101 is output to the plurality of storage devices. As the array controller 102, an RAID controller can be used, for example. Note that more than one array controller 102 may be provided.

The processor 131 of the array controller 102 has a function of specifying, in accordance with a program stored in the memory 132, any of the plurality of hard disks 104 (typified by the hard disk 104a and the hard disk 104b) in which data input from the host 101 is to be stored. Note that the number of the hard disks in which the data is stored may be either one or more than one.

The memory 132 has a function of storing a program to be executed by the processor 131 and a function of holding data while the processor 131 performs processing (e.g., the specification of the hard disk in which the data is to be stored). As in the memory 122, the above-described storage device including an oxide semiconductor transistor (details of the structure are described later) or a storage device in which a memory including an oxide semiconductor transistor and a DRAM are used in combination is used as the memory 132.

The data stored in the cache memory 103 of the array controller 102 is stored in any of the plurality of hard disks 104 which is specified by the processor 131. As mentioned above, the number of the hard disks in which the data is stored may be either one or more than one. In such a way, the manner in which data input from the host 101 is output to the hard disks 104 (which hard disk the data is output to, the number of the hard disks to which the data is output, or the like) is controlled.

Although the cache memory 103 is provided inside the array controller 102 in FIG. 1A, the cache memory 103 may be provided outside the array controller 102 as in FIG. 1B.

The cache memory 103 is a storage device including an oxide semiconductor transistor. As described above, an oxide semiconductor transistor has extremely low off-state current; thus, electric charge (data) of a node which is electrically connected to one of a source and a drain of the oxide semiconductor transistor can be held for a long time. A storage device including such an oxide semiconductor transistor with extremely low off-state current does not lose stored data even when power supply is stopped. Therefore, a power storage device for a cache memory is not needed for securement of power supply in the case of power failure.

In addition, since an oxide semiconductor transistor has extremely low off-state current, refresh operation is unnecessary or the frequency of refresh operation can be extremely low, which leads to adequate reduction in power consumption of the cache memory 103 and, further, the storage system.

In a storage device including an oxide semiconductor transistor, a gate insulating layer of a storage element does not deteriorate as in a flash memory, which removes the upper limit on the number of writing operations. Thus, by using a storage device including an oxide semiconductor transistor as the cache memory 103, a storage system which has no limitation on the number of writing operations can be provided.

Note that the structures of the oxide semiconductor transistor and the storage device including the oxide semiconductor transistor are described in detail later.

<Operation of Storage System>

Figure 2:
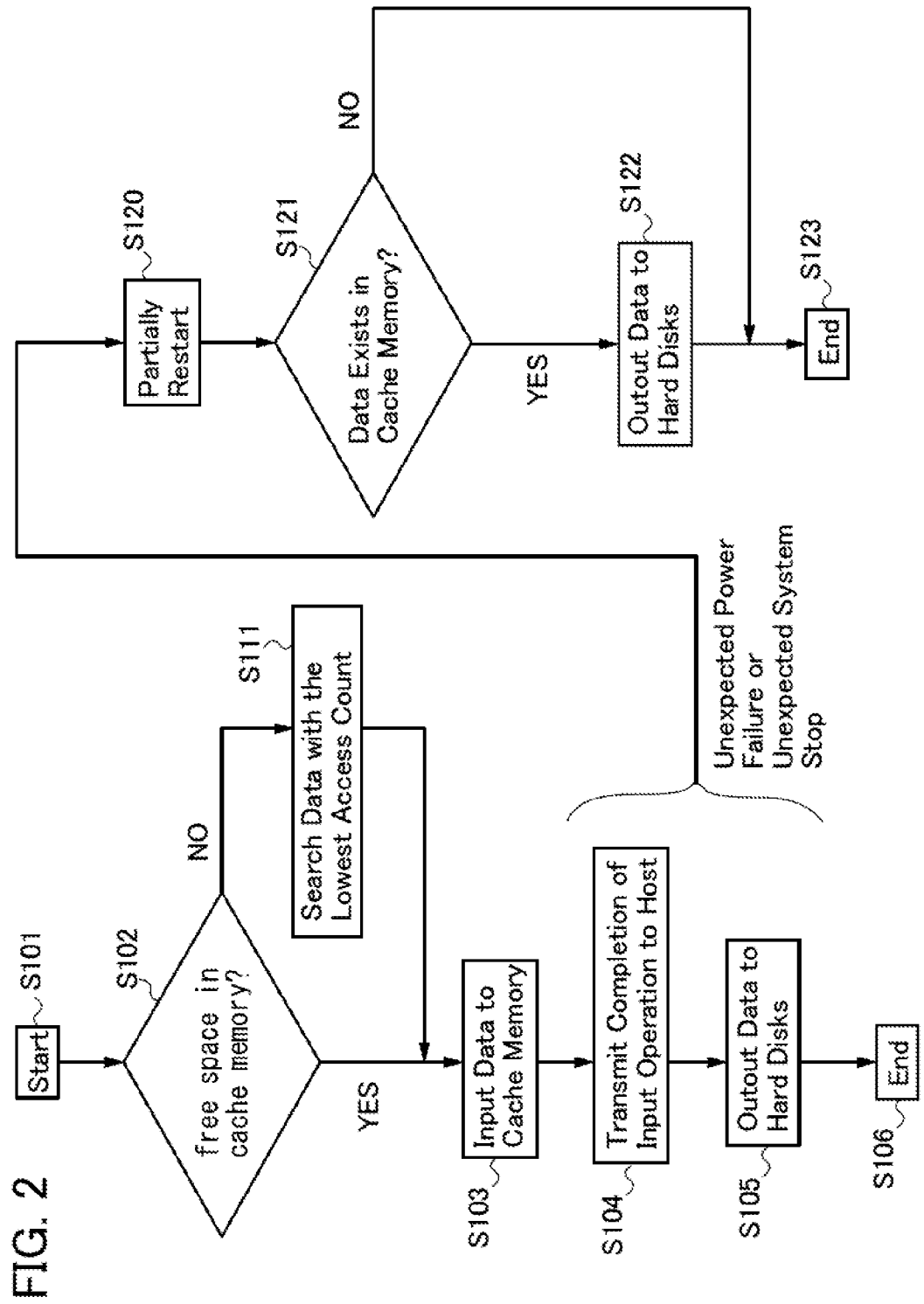
FIG. 2 is a flowchart illustrating the operation of a storage system.

FIG. 2 illustrates the operation of the storage system of this embodiment. When the operation of writing data from the host 101 into the storage system 100 starts (a step S101), it is checked whether there is a free space in the cache memory 103. When a free space is secured in the cache memory 103 (a step S102), the data is input to the free space of the cache memory 103 (a step S103).

When there is no free space in the cache memory 103 (the step S102), data with the lowest access count in the cache memory 103 is searched (a step S111). A access count is the number of times the data is referred to (read out or used), and a low access count indicates low necessity of the data.

When there is no free space in the cache memory 103, the data to be newly written in is input to a region where the data with the lowest access count is stored (the step S103). Note that another region selected by a method determined in advance can be used in the case of no free space in the cache memory 103.

After data input to the cache memory 103 is completed, data indicating the completion of input operation is transmitted to the host 101 (a step S104).

After the data indicating the completion of input operation is transmitted to the host 101, the data stored in the cache memory 103 is output to the hard disks 104 (a step S105). In this step, a flag word indicating that the data has been output to the hard disks 104 is put in the data stored in the cache memory 103. Note that the data and the flag word are overwritten when next data is input to the cache memory 103.

Thus, the data writing operation is completed (a step S106).

Note that the operation through the steps S101 to S106 is operation in the case where no unexpected power failure or unexpected system stop occurs. In the case where an unexpected power failure or unexpected system stop occurs after data is input to the cache memory 103 from the host 101, and when the data indicating the completion of input operation is transmitted to the host 101 (the step S104) or when the data stored in the cache memory 103 is output to the hard disks 104 (the step S105), the following operation starts.

When an unexpected power failure or unexpected system stop occurs, the storage system 100 immediately stops its operation. The cache memory 103, however, can store the data for a specified period (10 hours or more, for example) without any external power supply because the cache memory 103 includes a storage device using oxide semiconductors. After recovering from the unexpected power failure or unexpected system stop, initially, some portions in the storage system 100 (the hard disks 104, for example) except the cache memory 103 are restarted (partial restart, a step S120). Note that the host 101 and the like may be restarted at that time. Even the cache memory 103 may be restarted if the data is not to be lost. Or the storage system 100 may be constructed with an automatic restart architecture (i.e., an architecture where it is allowed to automatically access to the hard disks 104 after recovering the power supply). Anyway, it is required to make a condition under which the data stored in the cache memory 103 is not lost and can be input to the hard disks 104.

Next the host 101 or the storage system 100 confirms whether any un-output data exists in the cache memory 103 (a step S121). It may be programmed so that this step is automatically executed after recovering. When data exists in the cache memory 103, the data is output to the hard disks 104 (a step S122). Then, the operation is completed (a step S123).

When no data exists in the cache memory 103, the operation is immediately completed (the step S123).

Thus, the operation of writing data into the storage system in the case where an unexpected power failure or unexpected system stop occurs is completed. If needed, a configuration may be employed such that a manual or automatic restart of the storage system 100 and the host 101 is executed between the step S122 and the step S123. After the restart, if any external data is input to the interface 123, the data is input to the hard disks 104 through the steps from the step S101, again. A computer program for the above operations can be stored in a readable storage device provided in either the host 101 or the storage system 100 and can be executed by a processor provided in either the host 101 or the storage system 100. Note that this computer program may be stored in other storage mediums and may be transmitted or received via communication lines. Further, it may be transmitted by a request from a third party. Moreover, it may be relayed by some relay points (internet servers or the like).

<Structure of Storage Device Including Oxide Semiconductor Transistor>

A structure of the cache memory 103 illustrated in FIGS. 1A and 1B is described below. The cache memory 103 in FIGS. 1A and 1B is a storage device including an oxide semiconductor transistor. Moreover, a storage device including an oxide semiconductor transistor may be used as each of the memory 122 included in the host 101 and the memory 132 included in the array controller 102.

<<Structure of Oxide Semiconductor Transistor>>

First, FIGS. 3A to 3C illustrate a structure of an oxide semiconductor transistor of this embodiment. A transistor 440a illustrated in FIGS. 3A to 3C, which is a top-gate transistor, is an example of an oxide semiconductor transistor including an oxide semiconductor layer as an active layer. FIG. 3A is a plan view, FIG. 3B is a cross-sectional view along dashed-dotted line X1-X2 in FIG. 3A, and FIG. 3C is a cross-sectional view along dashed-dotted line Y1-Y2 in FIG. 3A.

As illustrated in FIG. 3B, which is a cross-sectional view in the channel length direction, and FIG. 3C, which is a cross-sectional view in the channel width direction, a semiconductor device including the transistor 440a includes, over a substrate 400 having an insulating surface over which a base insulating layer 436 is provided, an oxide semiconductor layer 403, a source electrode layer 405a, a drain electrode layer 405b, a gate insulating layer 402, a gate electrode layer 401, sidewall insulating layers 412 provided on side surfaces of the gate electrode layer 401, an insulating layer 413 over the gate electrode layer 401, an interlayer insulating layer 417 over the source electrode layer 405a and the drain electrode layer 405b, an interlayer insulating layer 415 over the interlayer insulating layer 417, and an insulating layer 407 covering the transistor 440a. Note that in FIG. 3A, some components are omitted for easy understanding.

An example of the base insulating layer 436 in this embodiment is a stack of a first base insulating layer 436a and a second base insulating layer 436b. An example of the gate insulating layer 402 in this embodiment is a stack of a first gate insulating layer 402a and a second gate insulating layer 402b. For each of the first base insulating layer 436a, the second gate insulating layer 402b, and the interlayer insulating layer 417, a material having a barrier property against oxygen and an impurity such as hydrogen, moisture, hydride, or hydroxide is preferably used. By applying a material having a barrier property to the above insulating layers, entry of impurities from the outside can be prevented and release of oxygen from the oxide semiconductor layer 403, the second base insulating layer 436b, and the first gate insulating layer 402a can be prevented.

The interlayer insulating layer 415 is provided for planarizing unevenness due to the transistor 440a. The height of a top surface of the interlayer insulating layer 415 (here, the "height of a top surface of the interlayer insulating layer 415" means a perpendicular distance from a surface of the substrate 400 to a top surface of the interlayer insulating layer 415) is substantially the same as that of each top surface of the sidewall insulating layers 412 and the insulating layer 413. Further, the height of each top surface of the source electrode layer 405a and the drain electrode layer 405b is lower than that of each top surface of the interlayer insulating layer 415, the sidewall insulating layers 412, and the insulating layer 413, and higher than that of a top surface of the gate electrode layer 401.

In FIGS. 3A to 3C, the insulating layer 407 is provided in contact with the interlayer insulating layer 415, the interlayer insulating layer 417, the source electrode layer 405a, the drain electrode layer 405b, the sidewall insulating layers 412, and the insulating layer 413.

Note that in this specification, a region of the oxide semiconductor layer 403 which overlaps with the gate electrode layer 401 is referred to as a channel formation region, a region of the oxide semiconductor layer 403 which is in contact with the source electrode layer 405a is referred to as a source region, and a region of the oxide semiconductor layer 403 which is in contact with the drain electrode layer 405b is referred to as a drain region. Further, a region of the oxide semiconductor layer 403 which is between the channel formation region and the source region is referred to as an offset region 406a, and a region of the oxide semiconductor layer 403 which is between the channel formation region and the drain region is referred to as an offset region 406b. The offset region 406a and the offset region 406b are formed in the oxide semiconductor layer 403 to overlap with the sidewall insulating layers 412.

In other words, the channel formation region, the source region, the drain region, the offset region 406a, and the offset region 406b are formed in a self-aligned manner. By providing the offset regions, parasitic capacitance generated between the gate electrode layer 401 and the source electrode layer 405a can be reduced. Further, parasitic capacitance generated between the gate electrode layer 401 and the drain electrode layer 405b can be reduced.

Since the channel formation region is formed in a self-aligned manner, miniaturization of the transistor can be easily achieved, and the transistor has excellent on-state characteristics (for example, on-state current and field-effect mobility) and can operate at high speed.

In the manufacturing process described below, in the case where an impurity element which changes the conductivity of an oxide semiconductor is added to the oxide semiconductor layer 403 using the gate electrode layer 401 as a mask, low-resistance regions are formed in a self-aligned manner between the source region and the channel formation region and between the drain region and the channel formation region. When the low-resistance regions are formed, the on-state resistance of the transistor 440a can be reduced and the operation speed thereof can be improved.

An oxide semiconductor to be used for the oxide semiconductor layer 403 preferably contains at least indium (In) or zinc (Zn). In particular, In and Zn are preferably contained. As a stabilizer for reducing variations in electric characteristics of a transistor including the oxide semiconductor, gallium (Ga) is preferably additionally contained. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

For the oxide semiconductor layer 403, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no particular limitation on the ratio of In:Ga:Zn. The In—Ga—Zn-based oxide may contain a metal element other than the In, Ga, and Zn.

A material represented by $InMO_3(ZnO)_m$ (m>0) may be used as the oxide semiconductor. Note that M represents one or more metal elements selected from Ga, Fe, Mn, and Co. Alternatively, a material represented by $In_2SnO_5(ZnO)_n$ (n>0) may be used as the oxide semiconductor.

For example, an In—Ga—Zn-based oxide with an atomic ratio of In:Ga:Zn=1:1:1 (=1/3:1/3:1/3), In:Ga:Zn=2:2:1 (=2/5:2/5:1/5), or In:Ga:Zn=3:1:2 (=1/2:1/6:1/3), or any of oxides whose composition is in the neighborhood of the above compositions can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or any of oxides whose composition is in the neighborhood of the above compositions may be used.

However, the composition is not limited to those described above, and a material having the appropriate composition may be used depending on necessary semiconductor characteristics (e.g., mobility, threshold voltage, and variation). In order to obtain necessary semiconductor characteristics, it is preferable that the carrier concentration, the impurity concentration, the defect density, the atomic ratio of a metal element to oxygen, the interatomic distance, the density, and the like be set to be appropriate.

For example, high mobility can be obtained relatively easily in the case of using an In—Sn—Zn-based oxide. However, mobility can be increased by reducing the defect density in a bulk also in the case of using an In—Ga—Zn-based oxide.

Note that for example, the expression "the composition of an oxide containing In, Ga, and Zn at the atomic ratio, In:Ga:Zn=a:b:c (a+b+c=1), is in the neighborhood of the composition of an oxide containing In, Ga, and Zn at the atomic ratio, In:Ga:Zn=A:B:C (A+B+C=1)" means that a, b, and c satisfy the following relation: $(a-A)^2+(b-B)^2+(c-C)^2 \leq r^2$. For example, r may be 0.05. The same applies to other oxides.

However, the composition is not limited to those described above, and a material having the appropriate composition may be used depending on necessary semiconductor characteristics (e.g., field-effect mobility and threshold voltage). In order to obtain necessary semiconductor characteristics, it is preferable that the carrier concentration, the impurity concentration, the defect density, the atomic ratio of a metal element to oxygen, the interatomic distance, the density, and the like be set to be appropriate.

When an oxide semiconductor is highly purified, the off-state current of a transistor using such an oxide semiconductor for a channel formation region in a semiconductor layer can be sufficiently reduced (as described above, the off-state current means drain current in the off state, for example, drain current when a potential difference between a source and a gate is equal to or lower than the threshold voltage). A highly purified oxide semiconductor can be obtained, for example, in such a manner that a film is deposited while heating is performed so as to prevent hydrogen and a hydroxyl group from being contained in the oxide semiconductor, or heat treatment is performed after film deposition so as to remove hydrogen and a hydroxyl group from the film. In the case where a highly purified In—Ga—Zn-based oxide is used for a channel formation region of a transistor having a channel length of 10 μm, a semiconductor film thickness of 30 nm, and a drain voltage of about 1 V to 10 V, the off-state current of the transistor can be $1 \times 10^{-13}$ A or less. In addition, the off-state current per channel width (the value obtained by dividing the off-state current by the channel width of the transistor) can be about $1 \times 10^{-23}$ A/μm (10 yA/μm) to $1 \times 10^{-22}$ A/μm (100 yA/μm).

Figure 12:
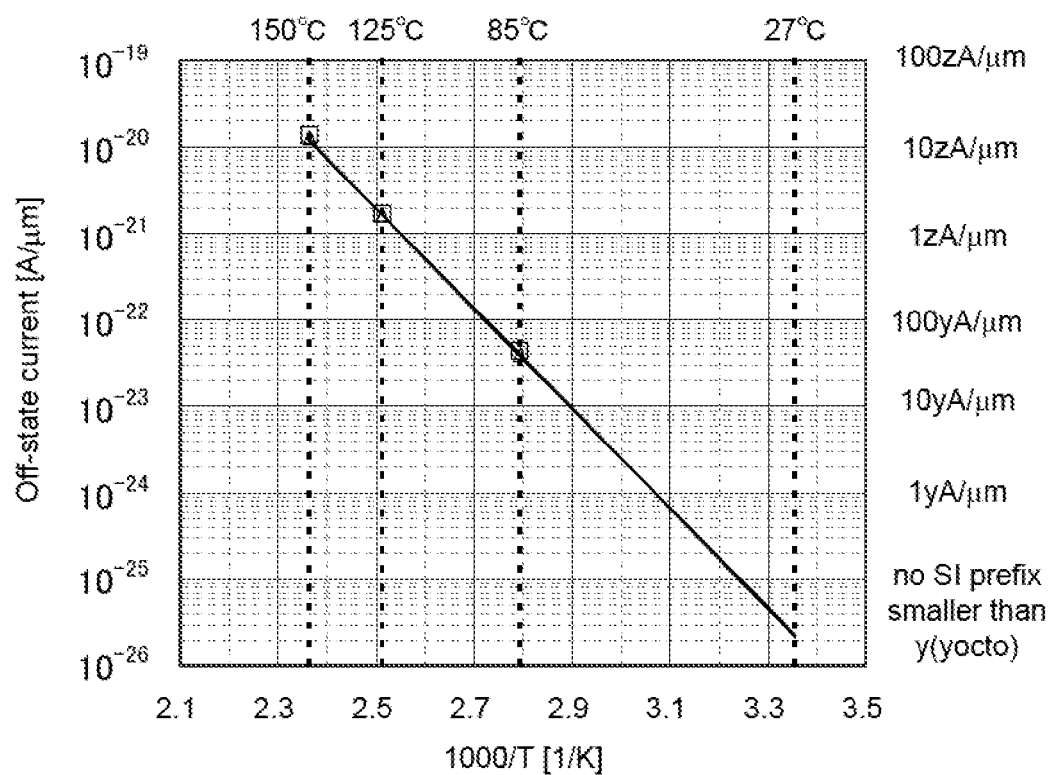
FIG. 12 is an Arrhenius plot diagram for showing off-state current.

In order to detect extremely low off-state current due to the use of a highly purified oxide semiconductor, a relatively large transistor is fabricated to measure the off-state current, whereby an off-state current that actually flows can be estimated. FIG. 12 shows an Arrhenius plot of the off-state current per channel width W of 1 μm of a large transistor having a channel width W of 1 m (1000000 μm) and a channel length L of 3 μm at the temperature of 150° C., 125° C., 85° C., and 27° C. As shown in FIG. 12, it is found that the off-state current is as extremely low as $3 \times 10^{-26}$ A/μm. The reason the off-state current is measured at elevated temperature is that a current at room temperature is too low to be measured.

An oxide semiconductor film disclosed in this embodiment may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a CAAC-OS (c-axis aligned crystalline oxide semiconductor).

For example, the oxide semiconductor film may include a CAAC-OS. In the CAAC-OS, for example, c-axes are aligned, and a-axes and/or b-axes are not macroscopically aligned.

For example, the oxide semiconductor film may include microcrystal. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example.

For example, the oxide semiconductor film may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that the oxide semiconductor film may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a stacked structure including a region of an amorphous oxide semiconductor, a region of a microcrystalline oxide semiconductor, and a region of a CAAC-OS, for example.

Note that the oxide semiconductor film may be in a single-crystal state, for example.

The oxide semiconductor film preferably includes a plurality of crystal parts. In each of the crystal parts, a c-axis is preferably aligned in a direction parallel to a normal vector of a surface where the oxide semiconductor film is formed or a normal vector of a surface of the oxide semiconductor film. Note that, among crystal parts, the directions of the a-axis and the b-axis of one crystal part may be different from those of another crystal part. An example of such an oxide semiconductor film is a CAAC-OS film.

Note that in most cases, a crystal part in the CAAC-OS film fits inside a cube whose one side is less than 100 nm. In an image obtained with a transmission electron microscope (TEM), a boundary between crystal parts in the CAAC-OS film is not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, a c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, crystallinity of the crystal part in a region to which the impurity is added is lowered in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

In a transistor using the CAAC-OS film, change in electric characteristics due to irradiation with visible light or ultraviolet light is small. Thus, the transistor has high reliability.

Note that part of oxygen included in the oxide semiconductor layer may be substituted with nitrogen.

In an oxide semiconductor having a crystal part such as the CAAC-OS, defects in the bulk can be further reduced and when the surface flatness of the oxide semiconductor is improved, mobility higher than that of an oxide semiconductor in an amorphous state can be obtained. In order to improve the surface flatness, the oxide semiconductor is preferably formed over a flat surface. Specifically, the oxide semiconductor may be formed over a surface with the average surface roughness ($R_a$) of less than or equal to 1 nm, preferably less than or equal to 0.3 nm, more preferably less than or equal to 0.1 nm.

Note that $R_a$ is obtained by expanding arithmetic mean surface roughness, which is defined by JIS B0601, into three dimensions so as to be applied to a surface. $R_a$ can be expressed as an "average value of the absolute values of deviations from a reference surface to a specific surface". $R_a$ can be measured using an atomic force microscope (AFM).

The oxide semiconductor layer has a thickness greater than or equal to 1 nm and less than or equal to 30 nm (preferably greater than or equal to 5 nm and less than or equal to 10 nm) and can be formed by a sputtering method, a molecular beam epitaxy (MBE) method, a CVD method, a pulsed laser deposition method, an atomic layer deposition (ALD) method, or the like as appropriate. The oxide semiconductor layer 403 may be formed with a sputtering apparatus which performs deposition in the state where top surfaces of a plurality of substrates are substantially perpendicular to a top surface of a sputtering target.

An example of a method for manufacturing a semiconductor device including the transistor 440a is described with reference to FIGS. 4A to 4D and FIGS. 5A to 5D.

Figure 4A:
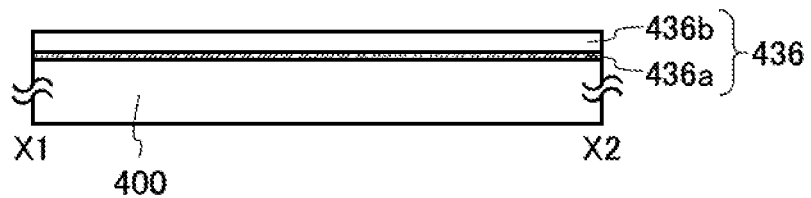
FIGS. 4A to 4D are cross-sectional views illustrating a manufacturing process of an oxide semiconductor transistor.

First, the base insulating layer 436 including the first base insulating layer 436a and the second base insulating layer 436b is formed over the substrate 400 (see FIG. 4A).

There is no particular limitation on a substrate that can be used as the substrate 400 as long as it has heat resistance high enough to withstand heat treatment performed later. For example, a glass substrate of barium borosilicate glass, aluminoborosilicate glass, or the like, a ceramic substrate, a quartz substrate, or a sapphire substrate can be used. A single crystal semiconductor substrate or a polycrystalline semiconductor substrate of silicon, silicon carbide, or the like; a compound semiconductor substrate of silicon germanium or the like; an SOI substrate; or the like can be used as the substrate 400, or the substrate provided with a semiconductor element can be used as the substrate 400.

The semiconductor device may be manufactured using a flexible substrate as the substrate 400. To manufacture a flexible semiconductor device, the transistor 440a including the oxide semiconductor layer 403 may be directly formed over a flexible substrate; or alternatively, the transistor 440a including the oxide semiconductor layer 403 may be formed over a manufacturing substrate and then separated and transferred to a flexible substrate. Note that in order to separate the transistor 440a from the manufacturing substrate and transfer it to the flexible substrate, a separation layer may be provided between the manufacturing substrate and the transistor 440a including the oxide semiconductor layer.

The base insulating layer 436 can be formed by a plasma CVD method, a sputtering method, or the like using silicon oxide, silicon nitride, silicon oxynitride, silicon nitride oxide, aluminum oxide, aluminum nitride, aluminum oxynitride, aluminum nitride oxide, hafnium oxide, gallium oxide, or a mixed material of any of these materials. Note that in this specification, oxynitride contains more oxygen than nitrogen, and nitride oxide contains more nitrogen than oxygen. The oxygen content and the nitrogen content are measured by Rutherford backscattering spectrometry (RBS) or hydrogen forward scattering spectrometry (HFS).

As the base insulating layer 436, a thermal oxidation film may be used. The thermal oxidation film can be formed in the following manner: a substrate is subjected to heat treatment in an oxidation atmosphere, so that a surface of the substrate is oxidized. For example, a single crystal silicon substrate is used as the substrate 400, and heat treatment is performed at 900° C. to 1200° C. in an atmosphere containing oxygen or water vapor for several hours, whereby a thermal oxidation film can be formed on a surface of the substrate 400.

The base insulating layer 436 may be either a single layer or a stack of layers. The base insulating layer 436 is preferably a stack in which an insulating layer containing a large amount of oxygen which exceeds at least the stoichiometric ratio in the layer (the bulk) and an insulating layer having a barrier property against oxygen and an impurity such as hydrogen, moisture, hydride, or hydroxide are stacked in this order from a side which is closer to the oxide semiconductor layer 403 described later. In that case, the base insulating layer 436 can supply oxygen to the oxide semiconductor layer 403 and inhibit release of oxygen from the oxide semiconductor layer 403. In this embodiment, the stack of the first base insulating layer 436a and the second base insulating layer 436b is used as the base insulating layer 436. The first base insulating layer 436a formed over the substrate 400 is preferably formed using a material having a barrier property against oxygen and an impurity such as hydrogen, moisture, hydride, or hydroxide, for example, silicon nitride or aluminum oxide. Since the second base insulating layer 436b formed over the first base insulating layer 436a is in contact with the oxide semiconductor layer 403, the insulating layer 436b preferably contains a large amount of oxygen which exceeds at least the stoichiometric ratio in the layer (the bulk). For example, in the case where the second base insulating layer 436b is formed using silicon oxide, the composition formula is $SiO_{2+\alpha}$ ($\alpha>0$). By using the second base insulating layer 436b as described above, oxygen can be supplied to the oxide semiconductor layer 403, leading to favorable characteristics. By the supply of oxygen to the oxide semiconductor layer 403, oxygen vacancies in the oxide semiconductor layer 403 can be filled.

In this embodiment, a single crystal silicon substrate is used as the substrate 400, a 50-nm-thick silicon nitride layer is formed over the substrate 400 by a plasma CVD method as the first base insulating layer 436a, and a 300-nm-thick silicon oxide layer is formed over the first base insulating layer 436a by a plasma CVD method as the second base insulating layer 436b.

The temperature at the time of forming the base insulating layer 436 is preferably as high as possible among temperatures that the substrate 400 can withstand. For example, the base insulating layer 436 is formed with the substrate 400 heated at a temperature higher than or equal to 350° C. and lower than or equal to 450° C. Note that the temperature at the time of forming the base insulating layer 436 is preferably constant. For example, the base insulating layer 436 is formed with the substrate 400 heated at 350° C.

After the base insulating layer 436 is formed, heat treatment may be performed thereon under reduced pressure, a nitrogen atmosphere, a rare gas atmosphere, or a nitrogen atmosphere with the ultra-dry air. The heat treatment can reduce the concentration of hydrogen, moisture, hydride, hydroxide, or the like in the base insulating layer 436. It is preferable that the temperature of the heat treatment be as high as possible among temperatures that the substrate 400 can withstand. Specifically, the heat treatment is preferably performed at a temperature higher than or equal to the film formation temperature of the base insulating layer 436 and lower than or equal to the strain point of the substrate 400.

Note that the hydrogen concentration in the base insulating layer 436 is preferably lower than $5 \times 10^{18}$ atoms/cm$^3$, further preferably lower than or equal to $1 \times 10^{18}$ atoms/cm$^3$, still further preferably lower than or equal to $5 \times 10^{17}$ atoms/cm$^3$, and further more preferably lower than or equal to $1 \times 10^{16}$ atoms/cm$^3$.

In order that the second base insulating layer 436b contains a large amount of oxygen which exceeds at least the stoichiometric ratio in the layer (the bulk), oxygen may be supplied to the second base insulating layer 436b.

By the supply of oxygen, a bond between a constituent element of the second base insulating layer 436b and hydrogen or a bond between the element and a hydroxyl group is cut, and the hydrogen or the hydroxyl group reacts with oxygen to produce water; this enables the hydrogen or the hydroxyl group that is an impurity to be easily eliminated as water by heat treatment performed after the supply of oxygen. Therefore, heat treatment may be performed after oxygen is supplied to the second base insulating layer 436b. After that, oxygen may be further supplied to the second base insulating layer 436b so that the second base insulating layer 436b is in an oxygen-excess state. The supply of oxygen and the heat treatment on the second base insulating layer 436b may be performed alternately a plurality of times. The supply of oxygen and the heat treatment may be performed at the same time.

Figure 4B:
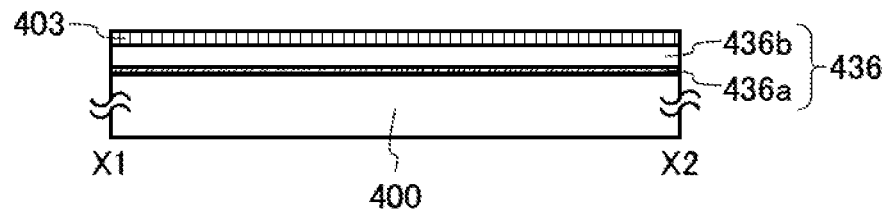
Figure 4C:
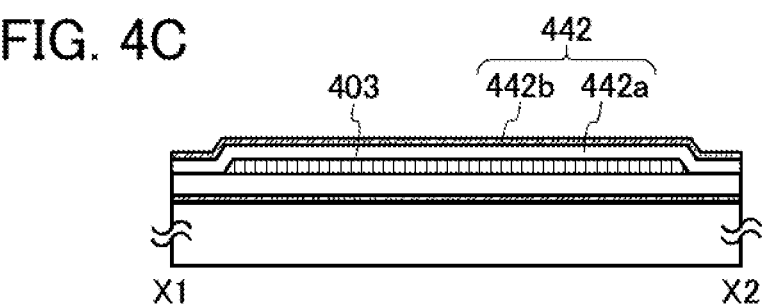

Next, the oxide semiconductor layer 403 is formed over the base insulating layer 436 by a sputtering method (see FIG. 4B).

In order that hydrogen or water be contained in the oxide semiconductor layer 403 as little as possible in the formation step of the oxide semiconductor layer 403, it is preferable to heat the substrate provided with the base insulating layer 436 in a preheating chamber in a sputtering apparatus as a pretreatment for formation of the oxide semiconductor layer 403 so that impurities such as hydrogen and moisture adsorbed to the substrate and the base insulating layer 436 are eliminated and removed. As an evacuation unit provided in the preheating chamber, a cryopump is preferable.

Planarization treatment may be performed on a region of the base insulating layer 436, which is in contact with the oxide semiconductor layer 403. As the planarization treatment, polishing treatment (e.g., a chemical mechanical polishing method), dry etching treatment, or plasma treatment can be used, though there is no particular limitation on the planarization treatment.

As plasma treatment, reverse sputtering in which an argon gas is introduced and plasma is generated can be performed. The reverse sputtering is a method in which voltage is applied to a substrate side with use of an RF power source in an argon atmosphere and plasma is generated in the vicinity of the substrate so that a substrate surface is modified. Note that instead of an argon atmosphere, a nitrogen atmosphere, a helium atmosphere, an oxygen atmosphere, or the like may be used. The reverse sputtering can remove particle substances (also referred to as particles or dust) attached to the surface of the base insulating layer 436.

As the planarization treatment, polishing treatment, dry etching treatment, or plasma treatment may be performed plural times, or these treatments may be performed in combination. In the case where the treatments are performed in combination, the order of steps is not particularly limited and may be set as appropriate depending on the unevenness of the surface of the base insulating layer 436.

Planarization treatment may be performed on a surface of the silicon oxide layer used as the second base insulating layer 436b by a chemical mechanical polishing method (the polishing conditions: a polyurethane-based polishing cloth, silica-based slurry, a slurry temperature of room temperature, a polishing pressure of 0.001 MPa, a rotation number in polishing (table/spindle) of 60 rpm/56 rpm, and a polishing time of 0.5 minutes) so that the average surface roughness ($R_a$) of the surface of the silicon oxide layer is approximately 0.15 nm.

A rare gas (typically argon) atmosphere, an oxygen atmosphere, or a mixed gas of a rare gas and oxygen is used as appropriate as a sputtering gas used for forming the oxide semiconductor layer 403. It is preferable that a high-purity gas from which impurities such as hydrogen, water, a hydroxyl group, and hydride are removed be used as a sputtering gas.

The oxide semiconductor layer 403 is preferably formed under a condition such that much oxygen is contained (e.g., by a sputtering method in an atmosphere where the proportion of oxygen is 100%) so as to contain much or oversaturated oxygen (preferably include a region containing oxygen in excess of the stoichiometric composition of the oxide semiconductor in a crystalline state).

For example, in the case where an oxide semiconductor layer is formed by a sputtering method, it is preferably performed under conditions where the proportion of oxygen in the sputtering gas is large; it is preferable that the sputtering gas contain an oxygen gas at 100%. The deposition under the conditions where the proportion of oxygen in the sputtering gas is large, in particular, in an atmosphere containing an oxygen gas at 100% enables release of Zn from the oxide semiconductor layer to be suppressed even when the deposition temperature is, for example, higher than or equal to 300° C.

It is preferable that the oxide semiconductor layer 403 be highly purified so as to hardly contain impurities such as copper, aluminum, or chlorine. In a process for manufacturing a transistor, a step which has no risk that such impurities enter the oxide semiconductor layer or adhere to the surface of the oxide semiconductor layer is preferably selected as appropriate. Specifically, the concentration of copper in the oxide semiconductor layer 403 is lower than or equal to $1\times10^{18}$ atoms/cm$^3$, preferably lower than or equal to $1\times10^{17}$ atoms/cm$^3$. Further, the concentration of aluminum in the oxide semiconductor layer 403 is lower than or equal to $1\times10^{18}$ atoms/cm$^3$. Further, the concentration of chlorine in the oxide semiconductor layer 403 is lower than or equal to $2\times10^{18}$ atoms/cm$^3$.

The concentrations of alkali metals such as sodium (Na), lithium (Li), and potassium (K) in the oxide semiconductor layer 403 are as follows. The concentration of Na is lower than or equal to $5\times10^{16}$ cm$^{-3}$, preferably lower than or equal to $1\times10^{16}$ cm$^{-3}$, further preferably lower than or equal to $1\times10^{15}$ cm$^{-3}$. The concentration of Li is lower than or equal to $5\times10^{15}$ cm$^{-3}$, preferably lower than or equal to $1\times10^{15}$ cm$^{-3}$. The concentration of K is lower than or equal to $5\times10^{15}$ cm$^{-3}$, preferably lower than or equal to $1\times10^{15}$ cm$^{-3}$.

In this embodiment, as the oxide semiconductor layer 403, a 35-nm-thick In—Ga—Zn-based oxide (IGZO) film is formed by a sputtering method using a sputtering apparatus including an AC power supply device. As a target for forming the oxide semiconductor layer 403 by a sputtering method, a metal oxide target having an atomic ratio of In:Ga:Zn=3:1:2 is used.

The relative density (the fill rate) of the metal oxide target is greater than or equal to 90% and less than or equal to 100%, preferably greater than or equal to 95% and less than or equal to 99.9%. By using the metal oxide target with high relative density, a dense oxide semiconductor layer 403 can be formed.

It is preferable to use a high-purity gas from which impurities such as hydrogen, water, a hydroxyl group, or hydride are removed as a sputtering gas used when the oxide semiconductor layer 403 is formed.

The substrate is held in a deposition chamber kept under reduced pressure. Then, a sputtering gas from which hydrogen and moisture are removed is introduced into the deposition chamber from which remaining moisture is being removed, and the oxide semiconductor layer 403 is formed over the substrate 400 with the use of the target. In order to remove moisture remaining in the deposition chamber, an entrapment vacuum pump such as a cryopump, an ion pump, or a titanium sublimation pump is preferably used. As an evacuation unit, a turbo molecular pump provided with a cold trap may be used. In the deposition chamber which is evacuated with the cryopump, for example, a hydrogen atom, a compound containing a hydrogen atom, such as water ($H_2O$), (further preferably, also a compound containing a carbon atom), and the like are removed, whereby the concentration of impurities in the oxide semiconductor layer 403 formed in the deposition chamber can be reduced.

The base insulating layer 436 and the oxide semiconductor layer 403 may be formed in succession without exposure to the air. By successive formation of the base insulating layer 436 and the oxide semiconductor layer 403 without exposure to the air, impurities such as hydrogen and moisture can be prevented from being attached to a surface of the base insulating layer 436.

Further, heat treatment may be performed in order to remove excess hydrogen (including water and a hydroxyl group) from the oxide semiconductor layer 403 (to perform dehydration or dehydrogenation) after the formation of the oxide semiconductor layer 403. The temperature of the heat treatment is higher than or equal to 300° C. and lower than or equal to 700° C., or lower than the strain point of the substrate. The heat treatment can be performed under reduced pressure, a nitrogen atmosphere, or the like. For example, the substrate is put in an electric furnace which is a kind of heat treatment apparatus, and the oxide semiconductor layer 403 is subjected to heat treatment at 450° C. for one hour in a nitrogen atmosphere.

The heat treatment apparatus is not limited to the electric furnace; a device for heating an object to be processed by heat conduction or heat radiation from a heating element such as a resistance heating element may be alternatively used. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high-temperature gas, an inert gas which does not react with an object to be processed by heat treatment, such as nitrogen or a rare gas like argon, is used.

For example, as the heat treatment, GRTA may be performed as follows: the substrate is put in an inert gas heated at a high temperature of 650° C. to 700° C., is heated for several minutes, and is taken out of the inert gas.

Note that in the heat treatment, it is preferable that water, hydrogen, and the like not be contained in nitrogen or a rare gas such as helium, neon, or argon. The purity of nitrogen or the rare gas such as helium, neon, or argon which is introduced into the heat treatment apparatus is set to preferably 6N (99.9999%) or higher, further preferably 7N (99.99999%) or higher (that is, the impurity concentration is preferably 1 ppm or lower, further preferably 0.1 ppm or lower).

In addition, after the oxide semiconductor layer 403 is heated by the heat treatment, a high-purity oxygen gas, a high-purity dinitrogen monoxide gas, or ultra dry air (the moisture amount is less than or equal to 20 ppm (−55° C. by conversion into a dew point), preferably less than or equal to 1 ppm, further preferably less than or equal to 10 ppb, in the measurement with use of a dew point meter of a cavity ring down laser spectroscopy (CRDS) system) may be introduced into the same furnace. It is preferable that water, hydrogen, and the like not be contained in the oxygen gas or the dinitrogen monoxide gas. The purity of the oxygen gas or the dinitrogen monoxide gas which is introduced into a heat treatment apparatus is preferably 6N or higher, further preferably 7N or higher (i.e., the impurity concentration in the oxygen gas or the dinitrogen monoxide gas is preferably 1 ppm or lower, further preferably 0.1 ppm or lower). The oxygen gas or the dinitrogen monoxide gas acts to supply oxygen that is a main constituent material of the oxide semiconductor and that is reduced by the step for removing an impurity for the dehydration or dehydrogenation, so that oxygen vacancies in the oxide semiconductor are reduced and the oxide semiconductor layer 403 can be an i-type (intrinsic) or substantially i-type oxide semiconductor. In this respect, it can be said that one embodiment of the disclosed invention includes a novel technical idea because it is different from an i-type semiconductor such as silicon added with an impurity element.

The timing of performing heat treatment for dehydration or dehydrogenation may be either before or after the island-shaped oxide semiconductor layer 403 is formed as long as it is after formation of the oxide semiconductor layer. The heat treatment for dehydration or dehydrogenation may be performed plural times and may also serve as another heat treatment.

The dehydration or dehydrogenation treatment may be accompanied by elimination of oxygen that is a main constituent material of the oxide semiconductor to lead to a reduction in oxygen. An oxygen vacancy exists in a portion where oxygen is eliminated in the oxide semiconductor layer, and a donor level which leads to a change in the electric characteristics of the transistor is formed owing to the oxygen vacancy.

Thus, oxygen (which includes at least one of oxygen radicals, oxygen atoms, and oxygen ions) may be supplied to the oxide semiconductor layer 403 which has been subjected to the dehydration or dehydrogenation treatment.

Such supply of oxygen to the oxide semiconductor layer 403 after the dehydration or dehydrogenation treatment enables a reduction in oxygen vacancies generated in the oxide semiconductor by the step for removing an impurity for the dehydration or dehydrogenation, so that the oxide semiconductor layer 403 can be made i-type (intrinsic). Variation in electric characteristics of a transistor including the i-type (intrinsic) oxide semiconductor layer 403 is suppressed, and the transistor is electrically stable.

By the supply of oxygen, a bond between a constituent element of the oxide semiconductor layer 403 and hydrogen or a bond between the element and a hydroxyl group is cut, and the hydrogen or the hydroxyl group reacts with oxygen to produce water; this enables the hydrogen or the hydroxyl group that is an impurity to be easily eliminated as water by heat treatment performed after the supply of oxygen. Therefore, heat treatment may be performed after oxygen is supplied to the oxide semiconductor layer 403. After that, oxygen may be further supplied to the oxide semiconductor layer 403 so that the oxide semiconductor layer 403 is in an oxygen-excess state. The supply of oxygen and the heat treatment on the oxide semiconductor layer 403 may be performed alternately a plurality of times. The supply of oxygen and the heat treatment may be performed at the same time.

As described above, it is preferable that the oxide semiconductor layer 403 be highly purified by sufficiently removing impurities such as hydrogen and be made to be an i-type (intrinsic) or substantially i-type (intrinsic) oxide semiconductor layer by reducing oxygen vacancies in the oxide semiconductor layer 403 by sufficiently supplying oxygen thereto.

Note that an oxide semiconductor which is highly purified (purified OS) by reduction of impurities such as moisture or hydrogen which serves as an electron donor (donor) can be made to be an i-type (intrinsic) oxide semiconductor or an oxide semiconductor extremely close to an i-type oxide semiconductor (a substantially i-type oxide semiconductor) by supplying oxygen to the oxide semiconductor to reduce oxygen vacancies in the oxide semiconductor. A transistor including the i-type or substantially i-type oxide semiconductor in a semiconductor layer where a channel is formed has a characteristic of a significantly low off-state current.

Specifically, the hydrogen concentration in the highly purified oxide semiconductor layer which is measured by secondary ion mass spectrometry (SIMS) is less than or equal to $5 \times 10^{19}$ atoms/cm$^3$, preferably less than or equal to $5 \times 10^{18}$ atoms/cm$^3$, further preferably less than or equal to $5 \times 10^{17}$ atoms/cm$^3$. In order that the oxide semiconductor layer 403 is supersaturated with oxygen by sufficient supply of oxygen, it is preferable that insulating layers each containing much oxygen (such as silicon oxide layers) be provided so as to sandwich and be in contact with the oxide semiconductor layer 403.

Further, the hydrogen concentration in the insulating layer containing much oxygen is important, because it affects characteristics of a transistor. In the case where the hydrogen concentration in the insulating layer containing much oxygen is greater than or equal to $7.2 \times 10^{20}$ atoms/cm$^3$, variation in initial characteristics of the transistor is increased, channel length dependence is increased, and the transistor significantly deteriorates in the BT stress test; therefore, the hydrogen concentration in the insulating layer containing much oxygen is preferably less than $7.2 \times 10^{20}$ atoms/cm$^3$. That is, it is preferable that the hydrogen concentration in the oxide semiconductor layer be less than or equal to $5 \times 10^{19}$ atoms/cm$^3$ and the hydrogen concentration in the insulating layer containing much oxygen be less than $7.2 \times 10^{20}$ atoms/cm$^3$.

The SIMS analysis of the hydrogen concentration is mentioned here. It is known to be difficult to obtain accurate data in the proximity of a surface of a sample or in the proximity of an interface between stacked films formed of different materials by the SIMS analysis in principle. Thus, in the case where the distribution of the hydrogen concentration in the thickness direction of a layer is analyzed by SIMS, the average value of the hydrogen concentration in a region of the layer where almost the same value can be obtained without significant variation is employed as the hydrogen concentration. Further, in the case where the thickness of the layer is small, a region where almost the same value can be obtained cannot be found in some cases due to the influence of the hydrogen concentration of an adjacent film. In this case, the maximum value or the minimum value of the hydrogen concentration in a region where the film is provided is employed as the hydrogen concentration of the film. Furthermore, in the case where a maximum value peak and a minimum value valley do not exist in the region where the film is provided, the value of the inflection point is employed as the hydrogen concentration.

Next, the oxide semiconductor layer 403 is processed into an island shape, and a gate insulating layer 442 is formed to cover the island-shaped oxide semiconductor layer 403.

To improve the coverage with the gate insulating layer 442, the above-described planarization treatment may be performed also on the surface of the oxide semiconductor layer 403. In particular, in the case where a thin insulating layer is used as the gate insulating layer 442, it is preferable that the oxide semiconductor layer 403 have improved surface flatness.

The gate insulating layer 442 has a thickness greater than or equal to 1 nm and less than or equal to 20 nm and can be formed by a sputtering method, an MBE method, a CVD method, a pulsed laser deposition method, an ALD method, or the like as appropriate. The gate insulating layer 442 may be formed with a sputtering apparatus which performs deposition in the state where top surfaces of a plurality of substrates are substantially perpendicular to a top surface of a sputtering target.

When a silicon oxide film or a silicon oxynitride film is formed by a CVD method as the gate insulating layer 442, glow discharge plasma is preferably generated by application of high-frequency power with a frequency of 3 MHz to 30 MHz, typically 13.56 MHz or 27.12 MHz in the HF band, or high-frequency power with a frequency of approximately 30 MHz to 300 MHz in the VHF band, typically 60 MHz. Alternatively, glow discharge plasma can be generated by applying high-frequency power at a microwave frequency of 1 GHz or more. Note that a pulsed oscillation by which high-frequency power is applied in a pulsed manner or a continuous oscillation by which high-frequency power is applied continuously may be applied. A silicon oxide film or a silicon oxynitride film which is formed using a microwave frequency of 1 GHz or more has a smaller fixed electric charge in the film or at the interface with the oxide semiconductor layer 403 than a silicon oxide film or a silicon oxynitride film which is formed by a normal plasma CVD method. Thus, the transistor can have high reliability in electric characteristics such as threshold voltage.

The gate insulating layer 442 may be either a single layer or a stack of layers. The gate insulating layer 442 is preferably a stack in which an insulating layer containing a large amount of oxygen which exceeds at least the stoichiometric ratio in the layer (the bulk) and an insulating layer having a barrier property against oxygen and an impurity such as hydrogen, moisture, hydride, or hydroxide are stacked in this order from a side which is closer to the oxide semiconductor layer 403. In that case, the gate insulating layer 442 can supply oxygen to the oxide semiconductor layer 403 and inhibit release of oxygen from the oxide semiconductor layer 403. The gate insulating layer 442 can be formed using silicon oxide, silicon nitride, silicon oxynitride, silicon nitride oxide, aluminum oxide, aluminum nitride, aluminum oxynitride, aluminum nitride oxide, hafnium oxide, gallium oxide, or a mixed material of any of these materials. In this embodiment, a stack of a first gate insulating layer 442a and a second gate insulating layer 442b is used as the gate insulating layer 442.

In general, a capacitor has such a structure that a dielectric is sandwiched between two electrodes that face to each other, and as the thickness of the dielectric is smaller (as the distance between the two facing electrodes is shorter) or as the dielectric constant of the dielectric is higher, the capacitance becomes higher. However, when the thickness of the dielectric is reduced in order to increase the capacitance of the capacitor, leakage current flowing between the two electrodes tends to be increased and the withstand voltage of the capacitor tends to be lowered.

A portion where a gate electrode, a gate insulating layer, and a semiconductor layer of a transistor overlap with each other functions as the above-described capacitor (hereinafter also referred to as "gate capacitor"). A channel is formed in a region in the semiconductor layer, which overlaps with the gate electrode with the gate insulating layer provided therebetween. In other words, the gate electrode and the channel formation region function as two electrodes of the capacitor, and the gate insulating layer functions as a dielectric of the capacitor. Although it is preferable that the capacitance of the gate capacitor be high, a reduction in the thickness of the gate insulating layer for the purpose of increasing the capacitance may cause an increase in the leakage current or a reduction in the withstand voltage.

In the case where a high-k material such as hafnium silicate ($HfSi_xO_y$ (x>0, y>0)), hafnium silicate to which nitrogen is added ($HfSi_xO_yN_z$ (x>0, y>0, z>0)), hafnium aluminate to which nitrogen is added ($HfAl_xO_yN_z$ (x>0, y>0, z>0)), hafnium oxide, or yttrium oxide is used for the gate insulating layer 442, even if the thickness of the gate insulating layer 442 is made thick, sufficient capacitance between the gate electrode layer 401 and the oxide semiconductor layer 403 can be ensured.

For example, in the case where a high-k material with a high dielectric constant is used for the gate insulating layer 442, even if the gate insulating layer 442 is made thick, a capacitance equivalent to that in the case of using silicon oxide for the gate insulating layer 442 can be obtained, so that the leakage current between the gate electrode layer 401 and the oxide semiconductor layer 403 can be reduced. Further, leakage current between the wiring formed of the same layer as the gate electrode layer 401 and another wiring that overlaps with the wiring can also be reduced. Note that the gate insulating layer 442 may have a stacked-layer structure of the high-k material and the above material.

It is preferable that the gate insulating layer 442 include oxygen in a portion which is in contact with the oxide semiconductor layer 403. In this embodiment, the first gate insulating layer 442a, which is in contact with the oxide semiconductor layer 403, preferably contains a large amount of oxygen which exceeds at least the stoichiometric ratio in the layer (the bulk). For example, in the case where a silicon oxide film is used as the first gate insulating layer 442a, the composition formula is $SiO_{2+a}$ (a>0). In this embodiment, a silicon oxide film of $SiO_{2+a}$ (a>0) is used as the first gate insulating layer 442a. By using the silicon oxide film as the first gate insulating layer 442a, oxygen can be supplied to the oxide semiconductor layer 403, leading to favorable characteristics. Further, the first gate insulating layer 442a is preferably formed in consideration of the size of a transistor to be formed and the step coverage with the first gate insulating layer 442a.

After the formation of the first gate insulating layer 442a, oxygen is preferably supplied to the first gate insulating layer 442a so that the first gate insulating layer 442a is in an oxygen-excess state, in which case oxygen can be supplied from the first gate insulating layer 442a to the oxide semiconductor layer 403.

By the supply of oxygen, a bond between a constituent element of the first gate insulating layer 442a and hydrogen or a bond between the element and a hydroxyl group is cut, and the hydrogen or the hydroxyl group reacts with oxygen to produce water; this enables the hydrogen or the hydroxyl group that is an impurity to be easily eliminated as water by heat treatment performed after the supply of oxygen. That is, the impurity concentration in the first gate insulating layer 442a can be further reduced. Therefore, heat treatment may be performed after oxygen is supplied to the first gate insulating layer 442a. After that, oxygen may be further supplied to the first gate insulating layer 442a so that the first gate insulating layer 442a is in an oxygen-excess state. The supply of oxygen and the heat treatment on the first gate insulating layer 442a may be performed alternately a plurality of times. The supply of oxygen and the heat treatment may be performed at the same time.

Next, the second gate insulating layer 442b is formed over the first gate insulating layer 442a. In this manner, the gate insulating layer 442, which is the stack of the first gate insulating layer 442a and the second gate insulating layer 442b, is formed over the oxide semiconductor layer 403 (see FIG. 4C). The second gate insulating layer 442b is preferably formed using a material having a barrier property against oxygen and an impurity such as hydrogen, moisture, hydride, or hydroxide, for example, silicon nitride or aluminum oxide.

Before the gate insulating layer 442 is formed, impurities such as moisture or organic substances attached to the surface of the oxide semiconductor layer 403 are preferably removed by plasma treatment using oxygen, dinitrogen monoxide, or a rare gas (typically argon).

Figure 4D:
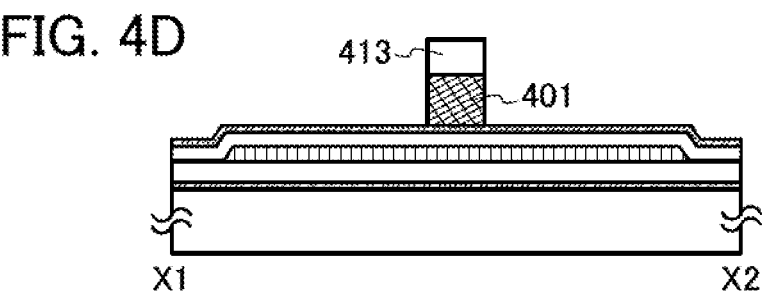

Next, a stack of a conductive layer 404 (not illustrated) for forming the gate electrode layer 401 and an insulating layer 408 (not illustrated) for forming the insulating layer 413 is formed over the gate insulating layer 442 and part of the conductive layer 404 and part of the insulating layer 408 are selectively etched by a first photolithography process, so that a stack of the gate electrode layer 401 and the insulating layer 413 is formed (see FIG. 4D).

Note that, unless otherwise specified, a photolithography process in this specification includes a step of forming a resist mask, a step of etching a conductive layer or an insulating layer, and a step of removing the resist mask.

In this embodiment, as the conductive layer 404, a 30-nm-thick tantalum nitride layer is formed over the gate insulating layer 442 by a sputtering method and a 135-nm-thick tungsten layer is formed over the tantalum nitride layer by a sputtering method. As the insulating layer 408, a 200-nm-thick silicon oxynitride layer is formed by a plasma CVD method.

A resist mask for forming the gate electrode layer 401 and the insulating layer 413 by selectively etching part of the conductive layer 404 and part of the insulating layer 408 may be formed by a printing method or an inkjet method. Formation of the resist mask by an inkjet method needs no photomask; thus, manufacturing cost can be reduced.

The etching for forming the gate electrode layer 401 and the insulating layer 413 may be dry etching, wet etching, or both dry etching and wet etching. In order to form a minute pattern, a dry etching method which can conduct anisotropic etching is preferably used.

In the case of etching the conductive layer 404 and the insulating layer 408 by a dry etching method, a gas containing a halogen element can be used as an etching gas. As an example of the gas containing a halogen element, a chlorine-based gas such as chlorine ($Cl_2$), boron trichloride ($BCl_3$), silicon tetrachloride ($SiCl_4$), or carbon tetrachloride ($CCl_4$); a fluorine-based gas such as carbon tetrafluoride ($CF_4$), sulfur hexafluoride ($SF_6$), nitrogen trifluoride ($NF_3$), or trifluoromethane ($CHF_3$); hydrogen bromide (HBr); or oxygen can be used as appropriate. An inert gas may be added to the etching gas. As the dry etching method, a parallel plate RIE (reactive ion etching) method or an ICP (inductively coupled plasma) etching method can be used. In order to etch the layers into desired shapes, the etching condition (the amount of electric power applied to a coil-shaped electrode, the amount of electric power applied to an electrode on a substrate side, the temperature of the electrode on the substrate side, or the like) is adjusted as appropriate.

The conductive layer 404 which is to be the gate electrode layer 401 later can be formed using a metal material such as molybdenum, titanium, tantalum, tungsten, aluminum, copper, chromium, neodymium, or scandium or an alloy material which contains any of these materials as its main component. Alternatively, a semiconductor film typified by a polycrystalline silicon film doped with an impurity element such as phosphorus, or a silicide film such as a nickel silicide film may be used as the conductive layer 404. The conductive layer 404 may have either a single-layer structure or a stacked-layer structure.

The conductive layer 404 can also be formed using a conductive material such as indium oxide-tin oxide, indium oxide containing tungsten oxide, indium zinc oxide containing tungsten oxide, indium oxide containing titanium oxide, indium tin oxide containing titanium oxide, indium oxide-zinc oxide, or indium tin oxide to which silicon oxide is added. It is also possible that the gate electrode layer 404 has a stacked structure of the above conductive material and the above metal material.

For one layer of the conductive layer 404 which is in contact with the gate insulating layer 442, a metal oxide containing nitrogen, specifically, an In—Ga—Zn-based oxide containing nitrogen, an In—Sn-based oxide containing nitrogen, an In—Ga-based oxide containing nitrogen, an In—Zn-based oxide containing nitrogen, tin oxide containing nitrogen, indium oxide containing nitrogen, or a metal nitride (InN, SnN, or the like), can be used. These materials each have a work function of 5 eV (electron volts) or higher, preferably 5.5 eV or higher, which enables the threshold voltage of the transistor to take a positive value when used as the gate electrode layer, so that a switching element of so-called normally-off type can be achieved.

For the insulating layer 413, typically, an inorganic insulating material such as silicon oxide, silicon oxynitride, aluminum oxide, aluminum oxynitride, silicon nitride, aluminum nitride, silicon nitride oxide, or aluminum nitride oxide can be used. The insulating layer 413 can be formed by a CVD method, a sputtering method, or the like.

Next, an insulating layer 411 (not illustrated) is formed over the gate electrode layer 401 and the insulating layer 413 and etched, so that the sidewall insulating layers 412 are formed. Further, the gate insulating layer 442 is etched with use of the gate electrode layer 401 and the sidewall insulating layers 412 as masks, so that the gate insulating layer 402 (the first gate insulating layer 402a and the second gate insulating layer 402b) is formed (see FIG. 5A).

The insulating layer 411 can be formed using a material and a method similar to those of the insulating layer 413. In this embodiment, a silicon oxynitride film formed by a CVD method is used.

Figure 5A:
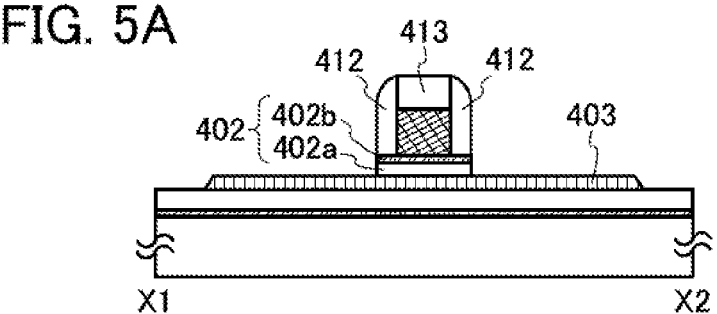
FIGS. 5A to 5D are cross-sectional views illustrating a manufacturing process of an oxide semiconductor transistor.
Figure 5B:
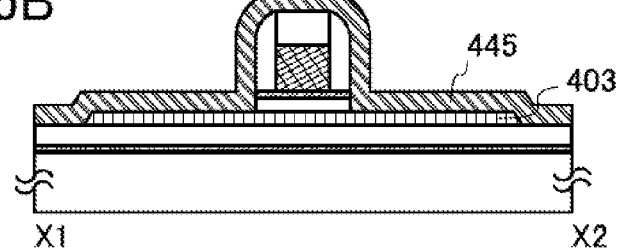

Next, a conductive layer 445 which is to be a source electrode layer and a drain electrode layer later (including a wiring formed in the same layer as the source electrode layer and the drain electrode layer) is formed over the oxide semiconductor layer 403, the gate insulating layer 402, the gate electrode layer 401, the sidewall insulating layers 412, and the insulating layer 413 (see FIG. 5B).

The conductive layer 445 is formed using a material that can withstand heat treatment performed later. For example, a metal film containing an element selected from aluminum (Al), chromium (Cr), copper (Cu), tantalum (Ta), titanium (Ti), molybdenum (Mo), tungsten (W), neodymium (Nd), scandium (Sc), and the like, a metal nitride film containing any of the above elements as its component (e.g., a titanium nitride film, a molybdenum nitride film, or a tungsten nitride film), or the like can be used. A film of a high-melting-point metal such as titanium (Ti), molybdenum (Mo), tungsten (W), or tantalum (Ta), or a metal nitride film thereof (e.g., a titanium nitride film, a molybdenum nitride film, or a tungsten nitride film) may be stacked on one of or both a bottom side and a top side of a low-resistance metal film of aluminum (Al), copper (Cu), or the like. When a film of a high-melting-point metal or a metal nitride film thereof is stacked on one of or both a bottom side and a top side of a low-resistance metal film, transfer (diffusion) of metal of the low-resistance metal film can be prevented, which is preferable. That is, the conductive layer 445 is a stack of a first conductive layer, a metal film which is a second conductive layer, and a third conductive layer, and a low-resistance conductive layer is used as the second conductive layer. For at least one of the first conductive layer and the third conductive layer, a material which can prevent the metal of the second conductive layer from moving is used. Further, when the third conductive layer over the second conductive layer covers an end portion of the second conductive layer, movement of metal from the end portion of the second conductive layer can be prevented, which is preferable.

For example, as the conductive layer 445, a stacked layer of tungsten (W), copper (Cu), and tantalum nitride is used, and copper (Cu), which has low resistance, is preferably sandwiched between tungsten (W) and tantalum nitride, which prevent copper from moving.

Alternatively, the conductive layer 445 may be formed using a conductive metal oxide. As the conductive metal oxide, indium oxide ($In_2O_3$), tin oxide ($SnO_2$), zinc oxide (ZnO), indium oxide-tin oxide (In$_2$O$_3$—SnO$_2$, which is abbreviated to ITO), indium oxide-zinc oxide (In$_2$O$_3$—ZnO), or any of these metal oxides in which silicon oxide is contained can be used.

In this embodiment, as the conductive layer 445, a tungsten layer with a thickness of 30 nm is formed by a sputtering method.

The conductive layer 445 is formed by a second photolithography process. Specifically, a resist mask is formed over the conductive layer 445, part of the conductive layer 445 is selectively etched, and the resist mask is removed, so that the island-shaped conductive layer 445 is formed. Note that in the above etching step, part of the conductive layer 445 which overlaps with the gate electrode layer 401 is not removed.

In the case where a tungsten layer with a thickness of 30 nm is used as the conductive layer 445, part of the tungsten layer may be selectively etched (etching conditions: an etching gas of CF$_4$, Cl$_2$, and O$_2$ (CF$_4$:Cl$_2$:O$_2$=55 sccm: 45 sccm: 55 sccm); a power of 3000 W; a bias power of 140 W; and a pressure of 0.67 Pa), so that an island-shaped tungsten layer is formed.

At this time, a constituent element of the conductive layer 445, an element in the treatment chamber, and a constituent element of an etching gas used for the etching are attached as impurities to the surface of the oxide semiconductor layer 403 which is exposed due to the formation of the conductive layer 445 in some cases.

Such attachment of the impurities tends to bring an increase in off-state current of the transistor or deterioration of the electric characteristics of the transistor. Further, a parasitic channel tends to be formed in the oxide semiconductor layer 403, which leads to electrical connection of electrodes or wirings, which need be electrically isolated from each other, through the oxide semiconductor layer 403.

Further, depending on the impurities, the impurities may enter the vicinity of the surface of the oxide semiconductor layer 403 (bulk) to extract oxygen from the oxide semiconductor layer 403, so that oxygen vacancies may be generated on the surface of and in the vicinity of the surface of the oxide semiconductor layer 403. For example, chlorine or boron contained in the above-described etching gas or aluminum which is a component material in the treatment chamber may cause a reduction in resistance of the oxide semiconductor layer 403 (may make the oxide semiconductor layer 403 n-type).

Thus, cleaning treatment for removing impurities (treatment for removing impurities) which are attached to the surface of the oxide semiconductor layer 403 is preferably performed after the etching for forming the conductive layer 445 is performed.

As the treatment for removing impurities, plasma treatment or treatment using a solution can be used. As the plasma treatment, oxygen plasma treatment, dinitrogen monoxide plasma treatment, or the like can be used. In addition, a rare gas (typically argon) may be used in the plasma treatment.

Further, for the cleaning treatment using a solution, an alkaline solution such as a tetramethylammonium hydroxide (TMAH) solution, an acidic solution such as diluted hydrofluoric acid or oxalic acid, water, or the like can be used. For example, when diluted hydrofluoric acid is used, 50 wt % hydrofluoric acid is diluted with water to approximately 1/10$^2$ to 1/10$^5$, preferably approximately 1/10$^3$ to 1/10$^5$. That is, diluted hydrofluoric acid having a concentration of 0.5 wt % to 5×10$^{-4}$ wt %, preferably 5×10$^{-2}$ wt % to 5×10$^{-4}$ wt %, is used for the cleaning treatment. By the cleaning treatment, the above-described impurities attached to the surface of the oxide semiconductor layer 403 can be removed.

Further, with the treatment for removing impurities using a diluted hydrofluoric acid solution, the surface of the oxide semiconductor layer 403 can be etched. That is, impurities attached to the surface of the oxide semiconductor layer 403 or impurities entering the vicinity of the surface of the oxide semiconductor layer 403 can be removed together with part of the oxide semiconductor layer 403. Accordingly, a region of the oxide semiconductor layer 403 which overlaps with the conductive layer 445 may be thicker than a region of the oxide semiconductor layer 403 which does not overlap with the conductive layer 445. In other words, a region of the oxide semiconductor layer 403 which overlaps with the source electrode layer 405a or the drain electrode layer 405b may be thicker than a region of the oxide semiconductor layer 403 which overlaps with neither the source electrode layer 405a nor the drain electrode layer 405b. For example, when an IGZO film is processed with 1/10$^3$ diluted hydrofluoric acid (0.05% hydrofluoric acid), the thickness of the IGZO film is reduced by 1 nm to 3 nm per second. When the IGZO film is processed with 2/10$^5$ diluted hydrofluoric acid (0.0025% hydrofluoric acid), the thickness of the IGZO film is reduced by approximately 0.1 nm per second.

By performing the treatment for removing impurities, the peak chlorine concentration at the surface of the semiconductor layer by SIMS can be reduced to be lower than or equal to 1×10$^{19}$/cm$^3$ (preferably lower than or equal to 5×10$^{18}$/cm$^3$, further preferably lower than or equal to 1×10$^{18}$/cm$^3$). The boron concentration at the surface of the semiconductor layer can be reduced to be lower than or equal to 1×10$^{19}$/cm$^3$ (preferably lower than or equal to 5×10$^{18}$/cm$^3$, further preferably lower than or equal to 1×10$^{18}$/cm$^3$). The aluminum concentration at the surface of the semiconductor layer can be reduced to be lower than or equal to 1×10$^{19}$/cm$^3$ (preferably lower than or equal to 5×10$^{18}$/cm$^3$, further preferably lower than or equal to 1×10$^{18}$/cm$^3$).

The treatment for removing impurities enables a highly reliable transistor having stable electric characteristics to be provided. Note that the treatment for removing impurities may also be performed after the gate insulating layer 402 is formed.

Figure 5C:
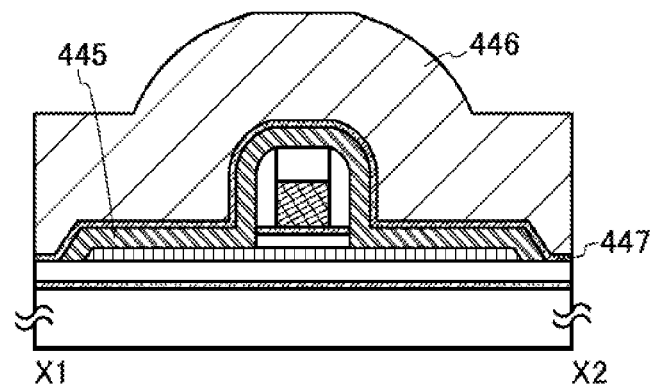

Next, an insulating layer 447 is formed over the island-shaped conductive layer 445, and an insulating layer 446 is formed over the insulating layer 447 (see FIG. 5C).

The insulating layer 447 can be formed using a material and a method similar to those of the second gate insulating layer 402b and the first base insulating layer 436a. The insulating layer 446 can be formed using a material and a method similar to those of the insulating layer 413. The insulating layer 447 is preferably formed using a material having a barrier property against oxygen and an impurity such as hydrogen, moisture, hydride, or hydroxide, for example, silicon nitride or aluminum oxide. In this embodiment, an aluminum oxide layer is formed with a thickness of 10 nm by a sputtering method as the insulating layer 447. When the aluminum oxide layer has high density (the film density is higher than or equal to 3.2 g/cm$^3$, preferably higher than or equal to 3.6 g/cm$^3$), the transistor 440a can have stable electric characteristics. The film density can be measured by Rutherford backscattering spectrometry (RBS) or X-ray reflection (XRR).

The insulating layer 446 is formed with such a thickness as to planarize unevenness caused by the layers formed over the substrate 400. In this embodiment, as the insulating layer 446, a 300-nm-thick silicon oxynitride layer is formed by a CVD method.

After the formation of the insulating layer 447, oxygen is preferably supplied to the insulating layer 447 so that the insulating layer 447 is in an oxygen-excess state, in which case oxygen can be supplied from the insulating layer 447 to the oxide semiconductor layer 403.

By the supply of oxygen, a bond between a constituent element of the insulating layer and hydrogen or a bond between the element and a hydroxyl group is cut, and the hydrogen or the hydroxyl group reacts with oxygen to produce water; this enables the hydrogen or the hydroxyl group that is an impurity to be easily eliminated as water by heat treatment performed after the supply of oxygen. That is, the impurity concentration in the insulating layer 447, the insulating layer 446, or both of them can be further reduced. Therefore, heat treatment may be performed after oxygen is supplied to the insulating layer 447, the insulating layer 446, or both of them. After that, oxygen may be further supplied to the insulating layer 447, the insulating layer 446, or both of them so that the insulating layer 447, the insulating layer 446, or both of them are in an oxygen-excess state. The supply of oxygen and the heat treatment on the insulating layer 447, the insulating layer 446, or both of them may be performed alternately a plurality of times. The supply of oxygen and the heat treatment may be performed at the same time.

Next, the insulating layer 446, the insulating layer 447, and the conductive layer 445 are subjected to polishing treatment by a chemical mechanical polishing method, and parts of the insulating layer 446, the insulating layer 447, and the conductive layer 445 are removed so that the insulating layer 413 is exposed.

By the polishing treatment, the insulating layer 446 is processed into the interlayer insulating layer 415, the insulating layer 447 is processed into the interlayer insulating layer 417, and the conductive layer 445 over the gate electrode layer 401 is removed, so that the source electrode layer 405a and the drain electrode layer 405b are formed.

Although the chemical mechanical polishing method is employed for removing the insulating layer 446, the insulating layer 447, and the conductive layer 445 in this embodiment, a different cutting (grinding or polishing) method may be employed. Further, in addition to the cutting (grinding or polishing) method such as a chemical mechanical polishing method, etching (dry etching or wet etching), plasma treatment, or the like may be employed in combination for the step of removing the conductive layer 445 over the gate electrode layer 401. For example, after the removing step by a chemical mechanical polishing method, dry etching or plasma treatment (e.g., reverse sputtering) may be performed in order to improve the flatness of the processed surface. In the case where a cutting (grinding or polishing) method is combined with etching, plasma treatment, or the like, the order of the steps is not limited and may be set as appropriate in accordance with the material, thickness, and surface unevenness of the insulating layer 446, the insulating layer 447, and the conductive layer 445.

Note that in this embodiment, the source electrode layer 405a and the drain electrode layer 405b are provided in contact with side surfaces of the sidewall insulating layers 412 provided on side surfaces of the gate electrode layer 401, and the source electrode layer 405a and the drain electrode layer 405b each of which has a top end portion positioned a little lower than those of the sidewall insulating layers 412 cover the side surfaces of the sidewall insulating layers 412. The shapes of the source electrode layer 405a and the drain electrode layer 405b depend on the conditions of the polishing treatment for removing the conductive layer 445, and in some cases, as shown in this embodiment, the source electrode layer 405a and the drain electrode layer 405b are depressed in the film thickness direction from the surfaces of the sidewall insulating layers 412 and the insulating layer 413 on which polishing treatment is performed. However, depending on the conditions of the polishing treatment, the top end portions of the source electrode layer 405a and the drain electrode layer 405b are almost aligned with the top end portions of the sidewall insulating layers 412 in some cases.

Figure 5D:
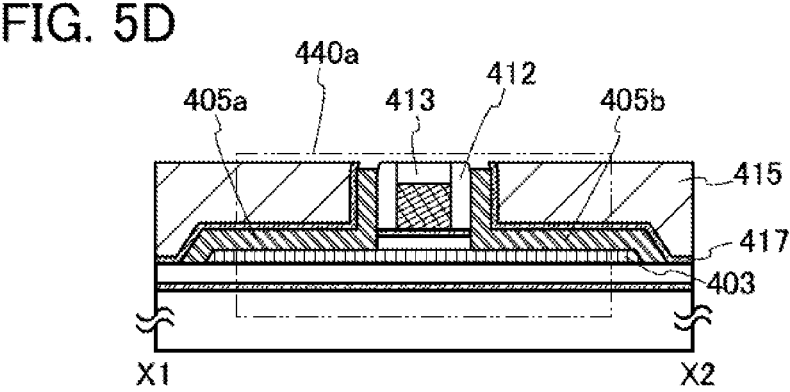

Through the above process, the transistor 440a of this embodiment can be manufactured (see FIG. 5D).

In the manufacturing process of the transistor 440a, the conductive layer 445 provided over the gate electrode layer 401, the insulating layer 413, and the sidewall insulating layers 412 is removed by chemical mechanical polishing treatment, so that the conductive layer 445 is divided; thus, the source electrode layer 405a and the drain electrode layer 405b are formed.

The source electrode layer 405a and the drain electrode layer 405b are provided in contact with the exposed portion of a top surface of the oxide semiconductor layer 403 and the sidewall insulating layers 412. Accordingly, the distance between the gate electrode layer 401 and a region (a source region or a drain region) in which the oxide semiconductor layer 403 is in contact with the source electrode layer 405a or the drain electrode layer 405b corresponds to a width of the sidewall insulating layer 412 in the channel length direction; thus, further miniaturization can be achieved and variation in the manufacturing process can be suppressed.

The reduction in the distance between the gate electrode layer 401 and the region (the source region or the drain region) in which the oxide semiconductor layer 403 is in contact with the source electrode layer 405a or the drain electrode layer 405b leads to a reduction in the resistance between the gate electrode layer 401 and the region (the source region or the drain region) in which the oxide semiconductor layer 403 is in contact with the source electrode layer 405a or the drain electrode layer 405b, whereby the on-state characteristics of the transistor 440a can be improved.

Further, precise processing can be performed accurately because etching with use of a resist mask is not performed when the conductive layer 445 over the gate electrode layer 401 is removed in a formation step of the source electrode layer 405a and the drain electrode layer 405b. Consequently, in a process for manufacturing the semiconductor device, the transistor 440a having a miniaturized structure with less variation in shape or characteristics can be manufactured with high yield.

When the conductive layer 445 over the gate electrode layer 401 is removed in the step for forming the source electrode layer 405a and the drain electrode layer 405b, part or all of the insulating layer 413 may be removed. FIG. 6C illustrates an example of a transistor 440c in which all of the insulating layer 413 is removed and the gate electrode layer 401 is exposed. Further, an upper part of the gate electrode layer 401 may also be removed. A structure in which the gate electrode layer 401 is exposed as in the transistor 440c can be used for an integrated circuit in which another wiring or another semiconductor element is stacked over the transistor 440c.

A highly dense inorganic insulating layer (typically an aluminum oxide layer) which is to be a protective insulating layer may be provided over the transistor 440a.

In this embodiment, the insulating layer 407 is formed over and in contact with the insulating layer 413, the source electrode layer 405a, the drain electrode layer 405b, the sidewall insulating layers 412, the interlayer insulating layer 417, and the interlayer insulating layer 415 (see FIG. 3B).

Instead of forming the interlayer insulating layer 417, a highly-dense inorganic insulating layer (typically an aluminum oxide layer) which is to be a protective insulating layer may be provided as the interlayer insulating layer 415. FIG. 6B illustrates an example of a transistor 440b in which the interlayer insulating layer 417 is not provided between the source electrode layer 405a and the interlayer insulating layer 415 and between the drain electrode layer 405b and the interlayer insulating layer 415.

The insulating layer 407 may have either a single-layer structure or a stacked-layer structure, and preferably includes at least an aluminum oxide layer.

The insulating layer 407 can be formed by a plasma CVD method, a sputtering method, an evaporation method, or the like.

Besides aluminum oxide, an inorganic insulating material such as silicon oxide, silicon nitride, silicon oxynitride, silicon nitride oxide, aluminum oxide, aluminum nitride, aluminum oxynitride, aluminum nitride oxide, or gallium oxide can be used as a material for the insulating layer 407, for example. Further, hafnium oxide, magnesium oxide, zirconium oxide, lanthanum oxide, barium oxide, or a metal nitride can also be used.

In this embodiment, an aluminum oxide layer is formed by a sputtering method as the insulating layer 407. When the aluminum oxide layer has high density (the film density is higher than or equal to 3.2 g/cm$^3$, preferably higher than or equal to 3.6 g/cm$^3$), the transistor 440a or the transistor 440b can have stable electric characteristics.

The aluminum oxide layer which can be used as the insulating layer 407 over the oxide semiconductor layer 403 has a high shielding effect (blocking effect) of preventing penetration of both oxygen and impurities such as hydrogen or moisture.

Therefore, in and after the manufacturing process, the insulating layer formed using aluminum oxide functions as a protective film for preventing impurities such as hydrogen or moisture, which cause a change in characteristics, from entering the oxide semiconductor layer 403 and also preventing oxygen, which is a main constituent material of the oxide semiconductor, from being released from the oxide semiconductor layer 403.

The insulating layer 407 is preferably formed using a method in which impurities such as water or hydrogen are prevented from entering the insulating layer 407 (preferably a sputtering method or the like) as appropriate.

In order to remove moisture remaining in a deposition chamber as in the case of the deposition of the oxide semiconductor layer, an entrapment vacuum pump (e.g., a cryopump) is preferably used. When the insulating layer 407 is formed in the deposition chamber evacuated using a cryopump, the impurity concentration in the insulating layer 407 can be reduced. As an evacuation unit for removing moisture remaining in the deposition chamber, a turbo molecular pump provided with a cold trap may be used.

It is preferable to use a high-purity gas from which impurities such as hydrogen, water, a hydroxyl group, or hydride are removed as a sputtering gas used when the insulating layer 407 is formed.

In addition, a planarization insulating layer may be formed over the transistor in order to reduce surface unevenness due to the transistor. For the planarization insulating layer, an organic material such as polyimide, an acrylic resin, or a benzocyclobutene-based resin can be used. Other than such organic materials, it is also possible to use a low-dielectric constant material (a low-k material) or the like. Note that the planarization insulating layer may be formed by stacking a plurality of insulating layers formed using any of these materials.

Figure 6A:
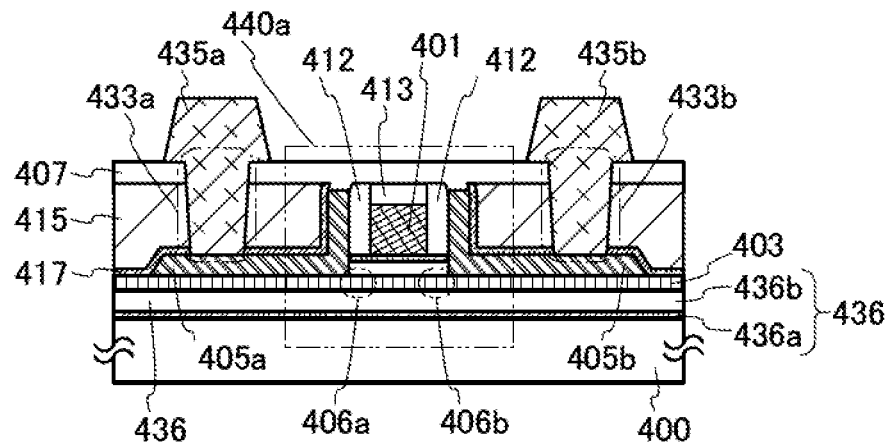
FIGS. 6A to 6C are cross-sectional views each illustrating an oxide semiconductor transistor.
Figure 6B:
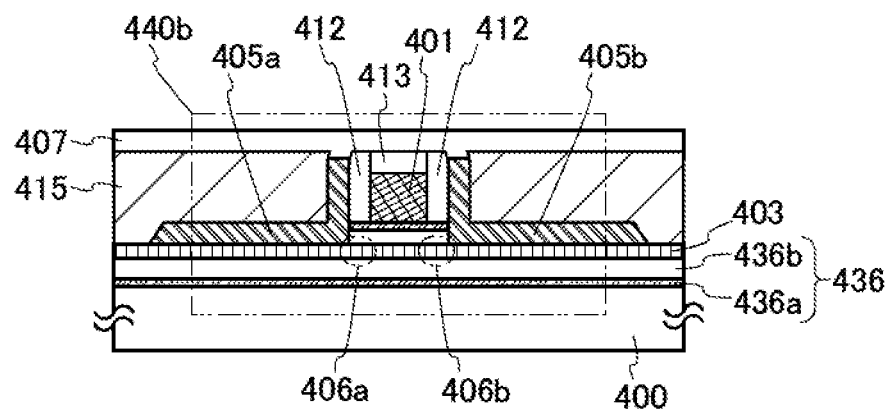
Figure 6C:
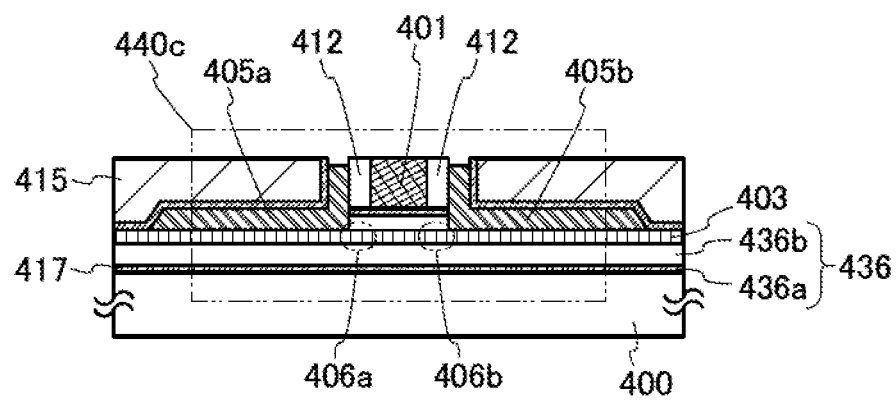

FIG. 6A shows an example in which an opening 433a and an opening 433b reaching the source electrode layer 405a and the drain electrode layer 405b, respectively, are formed in the insulating layer 407, the interlayer insulating layer 415, and the interlayer insulating layer 417, and a wiring layer 435a electrically connected to the source electrode layer 405a through the opening 433a and a wiring layer 435b electrically connected to the drain electrode layer 405b through the opening 433b are formed over the insulating layer 407. With use of the wiring layers 435a and 435b, the transistor 440a is connected to another transistor or another element, which can lead to formation of a variety of circuits.

The opening 433a and the opening 433b can be formed by selective etching of part of the insulating layer 407, part of the interlayer insulating layer 415, and part of the interlayer insulating layer 417 by a third photolithography process. The insulating layer 407, the interlayer insulating layer 415, and the interlayer insulating layer 417 may be etched by either a dry etching method or a wet etching method, or by both of them.

The wiring layer 435a and the wiring layer 435b can be formed in the following manner: after the opening 433a and the opening 433b are formed, a conductive layer for forming the wiring layer 435a and the wiring layer 435b is formed over the insulating layer 407 and part of the conductive layer is selectively etched by a fourth photolithography process.

The conductive layer for forming the wiring layers 435a and 435b can be formed using a material similar to those of the gate electrode layer 401, the source electrode layer 405a, and the drain electrode layer 405b.

The conductive layer for forming the wiring layers 435a and 435b is formed using a material that can withstand heat treatment performed later. For example, a metal film containing an element selected from aluminum (Al), chromium (Cr), copper (Cu), tantalum (Ta), titanium (Ti), molybdenum (Mo), tungsten (W), neodymium (Nd), scandium (Sc), and the like, a metal nitride film containing any of the above elements as its component (e.g., a titanium nitride film, a molybdenum nitride film, or a tungsten nitride film), or the like can be used. A film of a high-melting-point metal such as titanium (Ti), molybdenum (Mo), tungsten (W), or tantalum (Ta), or a metal nitride film thereof (e.g., a titanium nitride film, a molybdenum nitride film, or a tungsten nitride film) may be stacked on one of or both a bottom side and a top side of a low-resistance metal film of aluminum (Al), copper (Cu), or the like. When a film of a high-melting-point metal or a metal nitride film thereof is stacked on one of or both a bottom side and a top side of a low-resistance metal film, transfer (diffusion) of metal of the low-resistance metal film can be prevented, which is preferable. That is, the conductive layer for forming the wiring layers 435a and 435b is a stack of a first conductive layer, a metal film which is a second conductive layer, and a third conductive layer, and a low-resistance conductive layer is used as the second conductive layer. For at least one of the first conductive layer and the third conductive layer, a material which can prevent the metal of the second conductive layer from moving is used. Further, when the third conductive layer over the second conductive layer covers an end portion of the second conductive layer, movement of metal from the end portion of the second conductive layer can be prevented, which is preferable.

For example, as the conductive layer for forming the wiring layers 435a and 435b, a stacked layer of tungsten (W), copper (Cu), and tantalum nitride is used, and copper (Cu), which has low resistance, is preferably sandwiched between tungsten (W) and tantalum nitride, which prevent copper from moving.

A conductive layer used for the wiring layers 435a and 435b may be formed using conductive metal oxide. As the conductive metal oxide, indium oxide ($In_2O_3$), tin oxide ($SnO_2$), zinc oxide (ZnO), indium oxide-tin oxide ($In_2O_3$—$SnO_2$, which is abbreviated to ITO), indium oxide-zinc oxide ($In_2O_3$—ZnO), or any of these metal oxide materials in which silicon oxide is contained can be used.

As the wiring layers 435a and 435b, a single layer of molybdenum, a stack of tantalum nitride and copper, a stack of tantalum nitride and tungsten, or the like can be used.

According to this embodiment, in a semiconductor device, the transistor 440a, 440b, or 440c having a miniaturized structure with less variation in shapes or characteristics and high on-state characteristics can be provided with high yield.

Accordingly, a semiconductor device which is miniaturized and has good electric characteristics and a method for manufacturing the semiconductor device can be provided.

Note that the oxide semiconductor layer 403 may have a structure in which a plurality of oxide semiconductor layers is stacked. For example, the oxide semiconductor layer 403 may be a stack of a first oxide semiconductor layer and a second oxide semiconductor layer that are formed using metal oxides with different compositions.

Further, the constituent elements of the first oxide semiconductor layer and the second oxide semiconductor layer may be the same as each other but the composition of the constituent elements of the first oxide semiconductor layer and the second oxide semiconductor layer may be different from each other. For example, the first oxide semiconductor layer may have an atomic ratio of In:Ga:Zn=1:1:1, and the second oxide semiconductor layer may have an atomic ratio of In:Ga:Zn=3:1:2. Alternatively, the first oxide semiconductor layer may have an atomic ratio of In:Ga:Zn=1:3:2, and the second oxide semiconductor layer may have an atomic ratio of In:Ga:Zn=2:1:3.

In this case, one of the first oxide semiconductor layer and the second oxide semiconductor layer which is closer to the gate electrode (on a channel side) preferably contains In and Ga at a proportion satisfying In>Ga. The other which is farther from the gate electrode (on a back channel side) preferably contains In and Ga at a proportion satisfying In≤Ga.

In an oxide semiconductor, the s orbital of heavy metal mainly contributes to carrier transfer, and when the In content in the oxide semiconductor is increased, overlap of the s orbitals is likely to be increased. Therefore, an oxide having a composition where In>Ga has higher mobility than an oxide having a composition where In≤Ga. Further, in Ga, the formation energy of an oxygen vacancy is larger and thus an oxygen vacancy is less likely to be generated than in In; therefore, the oxide having a composition where In≤Ga has more stable characteristics than the oxide having a composition where In>Ga.

An oxide semiconductor containing In and Ga at a proportion satisfying In>Ga is used on a channel side, and an oxide semiconductor containing In and Ga at a proportion satisfying In≤Ga is used on a back channel side, so that field-effect mobility and reliability of a transistor can be further improved.

Further, oxide semiconductors having different crystallinities may be used for the first oxide semiconductor layer and the second oxide semiconductor layer. That is, two of a single crystal oxide semiconductor, a polycrystalline oxide semiconductor, an amorphous oxide semiconductor, and a CAAC-OS may be combined as appropriate. When an amorphous oxide semiconductor is used for at least one of the first oxide semiconductor layer and the second oxide semiconductor layer, internal stress or external stress of the oxide semiconductor layer 403 is relieved, variation in characteristics of a transistor is reduced, and reliability of the transistor can be further improved.

On the other hand, an amorphous oxide semiconductor is likely to absorb an impurity which serves as a donor, such as hydrogen, and an oxygen vacancy is likely to be generated; thus, an amorphous oxide semiconductor easily becomes n-type. For this reason, it is preferable to use an oxide semiconductor having crystallinity such as a CAAC-OS for the oxide semiconductor layer on the channel side.

Further, in a bottom-gate transistor of a channel-etch type, oxygen vacancies are likely to be generated by etching treatment for forming the source electrode and the drain electrode to make the transistor n-type, in the case where an amorphous oxide semiconductor is used on the back channel side. Therefore, in the case of the transistor of a channel-etch type, it is preferable to use an oxide semiconductor having crystallinity for the oxide semiconductor layer on the back channel side.

Further, the oxide semiconductor layer 403 may have a stacked-layer structure including three or more layers in which an amorphous oxide semiconductor layer is interposed between a plurality of oxide semiconductor layers having crystallinity. Furthermore, a structure in which an oxide semiconductor layer having crystallinity and an amorphous oxide semiconductor layer are alternately stacked may be employed.

These two structures for making the oxide semiconductor layer 403 have a stacked-layer structure of a plurality of layers can be combined as appropriate.

In the case where the oxide semiconductor layer 403 has a stacked-layer structure of a plurality of layers, oxygen may be supplied each time the oxide semiconductor layer is formed. For the supply of oxygen, heat treatment performed in an oxygen atmosphere, an ion implantation method, an ion doping method, a plasma immersion ion implantation method, plasma treatment performed in an atmosphere containing oxygen, or the like can be employed.

Note that the oxide semiconductor transistor in this embodiment includes at least the gate electrode layer 401 on one side of the oxide semiconductor layer 403 with the gate insulating layer 402 provided therebetween. Alternatively, the oxide semiconductor transistor may include a pair of gate electrode layers with the oxide semiconductor layer 403 provided therebetween. In the case where the oxide semiconductor transistor includes a pair of gate electrode layers with the oxide semiconductor layer 403 provided therebetween, one of the gate electrode layers is connected to a signal line, and the other of the gate electrode layers (also referred to as a back gate) may be in a floating state (i.e., electrically isolated) or may be supplied with a potential. In the latter case, potentials with the same level may be supplied to the pair of gate electrode layers, or a fixed potential such as a ground potential may be supplied only to the back gate. By controlling the level of the potential supplied to the back gate, the threshold voltage of the oxide semiconductor transistor can be controlled. The oxide semiconductor transistor can easily be kept in a normally-off state through the control of the threshold voltage of the oxide semiconductor transistor.

Figure 11A:
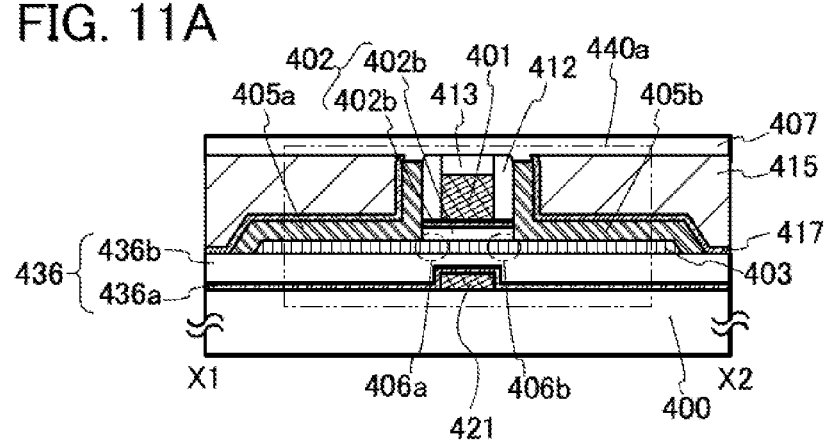
FIGS. 11A to 11C are cross-sectional views each illustrating an oxide semiconductor transistor.

FIG. 11A illustrates an example in which another gate electrode layer 421 is provided on a side opposite to the gate electrode layer 401 side with respect to the oxide semiconductor layer 403 (i.e., the substrate 400 side) in the transistor 440a illustrated in FIG. 3B. The provision of the gate electrode layer 421 (back gate) facilitates the control of the threshold voltage of the transistor 440a. In the case where the gate electrode layer 421 (back gate) is provided, the base insulating layer 436 (the first base insulating layer 436a and the second base insulating layer 436b) also functions as a gate insulating layer.

<<Another Structure of Oxide Semiconductor Transistor>>

FIGS. 9A and 9B illustrate an oxide semiconductor transistor with a structure different from that of the oxide semiconductor transistor in FIGS. 3A to 3C. FIG. 9A is a plan view of a transistor 350, and FIG. 9B is a cross-sectional view taken along dashed-dotted line E-F in FIG. 9A. Note that in FIG. 9A, some components of the transistor 350 (e.g., a substrate 301, a base insulating layer 303, and a gate insulating layer 313) are omitted for simplicity.

As shown in FIGS. 9A and 9B, in the transistor 350, the base insulating layer 303 is provided over the substrate 301; an oxide semiconductor layer 305 is provided over the base insulating layer 303; a source electrode layer 337a and a drain electrode layer 337b are provided in contact with the oxide semiconductor layer 305; the gate insulating layer 313 is provided over the oxide semiconductor layer 305, the source electrode layer 337a, and the drain electrode layer 337b; a gate electrode layer 317 is provided over the gate insulating layer 313 to overlap with part of the oxide semiconductor layer 305, part of the source electrode layer 337a, and part of the drain electrode layer 337b; a protective insulating layer 321 is provided over the gate insulating layer 313 and the gate electrode layer 317; an interlayer insulating layer 323 is provided over the protective insulating layer 321; and a source wiring 327a and a drain wiring 327b which are in contact with the source electrode layer 337a and the drain electrode layer 337b are provided in openings 325a and 325b formed in the gate insulating layer 313, the protective insulating layer 321, and the interlayer insulating layer 323. Note that the base insulating layer 303 and the interlayer insulating layer 323 are not necessarily provided.

The transistor 350 is a top-gate transistor in which the gate electrode layer 317 is provided over the oxide semiconductor layer 305.

The oxide semiconductor layer 305 includes a channel formation region, a source region, and a drain region.

In the transistor 350, the gate insulating layer 313 is formed in such a manner that oxygen contained in the oxide semiconductor layer 305 is not eliminated. Or the gate insulating layer 313 is formed at a temperature lower than a temperature at which oxygen contained in the oxide semiconductor layer 305 is eliminated. The gate insulating layer 313 can be formed by a plasma CVD method using a microwave. Thus, generation of oxygen vacancies in the step of forming the gate insulating layer 313 can be inhibited. Further, the insulating film formed by a plasma CVD method using a microwave is a dense film, and therefore, the gate insulating layer 313 is a dense film. Owing to this, oxygen contained in the oxide semiconductor layer 305 can be inhibited from being released to the outside through the gate insulating layer 313 (generation of oxygen vacancies can be inhibited) after the gate insulating layer 313 is formed in a manufacturing process of the transistor 350. Thus, the transistor 350 has favorable electric characteristics.

The thickness of the gate insulating layer 313 is greater than or equal to 5 nm and less than or equal to 300 nm. In order that the transistor is miniaturized or the on-state current and the field-effect mobility of the transistor be improved, the gate insulating layer 313 is preferably formed thin. For example, the thickness of the gate insulating layer 313 is preferably greater than or equal to 5 nm and less than or equal to 50 nm, further preferably greater than or equal to 10 nm and less than or equal to 30 nm.

Further, even when the gate insulating layer 313 is formed thin (e.g., to a thickness of 20 nm or less) in order to miniaturize the transistor or to improve on-state current characteristics of the transistor, since the gate insulating layer 313 is dense, oxygen contained in the oxide semiconductor layer 305 can be inhibited from being eliminated and released to the outside through the gate insulating layer 313 (generation of oxygen vacancies can be inhibited). Accordingly, the transistor 350 has favorable electric characteristics even when miniaturized.

Note that the transistor 350 in FIGS. 9A and 9B includes at least the gate electrode layer 317 on one side of the oxide semiconductor layer 305 with the gate insulating layer 313 provided therebetween. Alternatively, the transistor 350 may include a pair of gate electrode layers with the oxide semiconductor layer 305 provided therebetween. In the case where the transistor 350 includes a pair of gate electrode layers with the oxide semiconductor layer 305 provided therebetween, one of the gate electrode layers is connected to a signal line, and the other of the gate electrode layers (also referred to as a back gate) may be in a floating state (i.e., electrically isolated) or may be supplied with a potential. In the latter case, potentials with the same level may be supplied to the pair of gate electrode layers, or a fixed potential such as a ground potential may be supplied only to the back gate. By controlling the level of the potential supplied to the back gate, the threshold voltage of the oxide semiconductor transistor can be controlled. The oxide semiconductor transistor can easily be kept in a normally-off state through the control of the threshold voltage of the oxide semiconductor transistor.

Figure 11B:
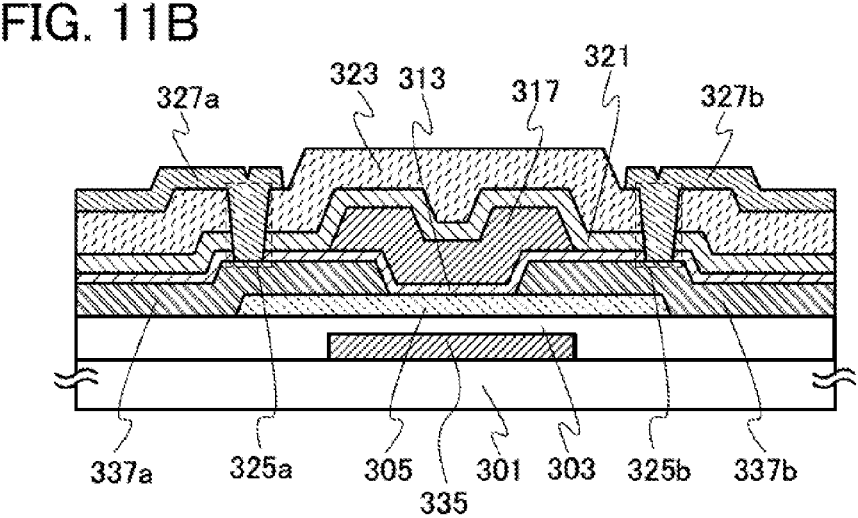

FIG. 11B illustrates an example in which another gate electrode layer 335 is provided on a side opposite to the gate electrode layer 317 side with respect to the oxide semiconductor layer 305 (i.e., the substrate 301 side) in the transistor 350 illustrated in FIG. 9B. The provision of the gate electrode layer 335 (back gate) facilitates the control of the threshold voltage of the transistor 350. In the case where the gate electrode layer 335 (back gate) is provided, the base insulating layer 303 also functions as a gate insulating layer.

Here, a transistor 360 in which the gate electrode layer 317 overlaps with only the oxide semiconductor layer and a dopant is injected into a part of the oxide semiconductor layer in the transistor 350 is described.

Figure 10A:
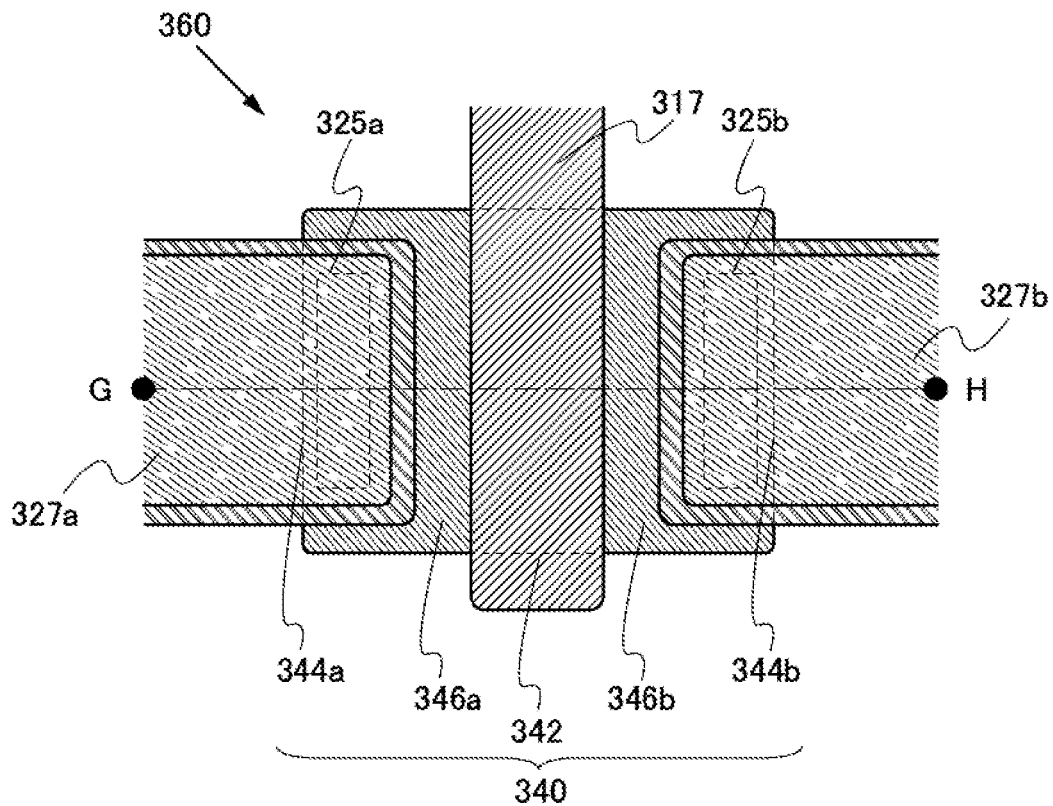
FIGS. 10A and 10B are a plan view and a cross-sectional view of an oxide semiconductor transistor.
Figure 10B:
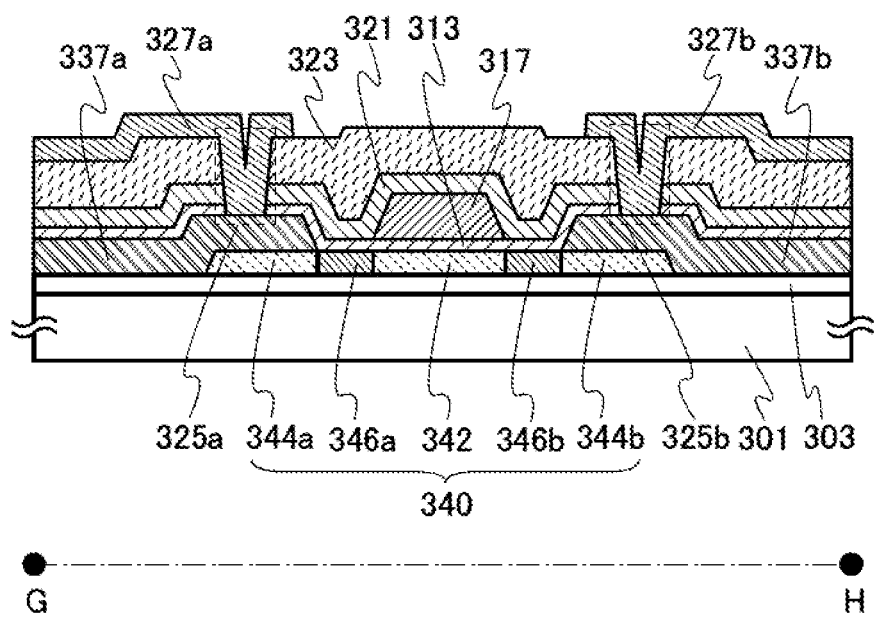

FIGS. 10A and 10B are a plan view and a cross-sectional view which illustrate the transistor 360. FIG. 10A is a plan view of the transistor 360, and FIG. 10B is a cross-sectional view taken along dashed-dotted line G-H in FIG. 10A. Note that in FIG. 10A, some components of the transistor 360 (e.g., the substrate 301, the base insulating layer 303, and the gate insulating layer 313) are omitted for simplicity.

As shown in FIGS. 10A and 10B, the transistor 360 has a structure such that the oxide semiconductor layer 305 in the transistor 350 is replaced with an oxide semiconductor layer 340.

The transistor 360 is a top-gate transistor in which the gate electrode layer 317 is provided over the oxide semiconductor layer 340.

The oxide semiconductor layer 340 includes a first region 342, a pair of second regions 344a and 344b, and a pair of third regions 346a and 346b. The pair of second regions 344a and 344b faces each other with the first region 342 interposed therebetween. The pair of third regions 346a and 346b faces each other. The third region 346a is interposed between the first region 342 and the second region 344a, and the third region 346b is interposed between the first region 342 and the second region 344b.

The first region 342 and the pair of second regions 344a and 344b are regions including no dopant. The pair of third regions 346a and 346b includes a dopant. The first region 342 serves as a channel formation region, and the pair of second regions 344a and 344b are in contact with the source electrode layer 337a and the drain electrode layer 337b. Thus, the resistance of a region in the vicinity of the interface between the second region 344a and the source electrode layer 337a and the resistance of a region in the vicinity of the interface between the second region 344b and the drain electrode layer 337b are reduced. Therefore, the pair of second regions 344a and 344b serves as a source region and a drain region.

The transistor 360 includes low-resistance regions into which a dopant is injected, such as the pair of third regions 346a and 346b. That is, the resistance of part of the oxide semiconductor layer 340 is reduced, leading to improvement in on-state current and field-effect mobility of the transistor 360. Hence, the transistor 360 is a transistor having high on-state current characteristics and high field-effect mobility.

In the transistor 360, the gate insulating layer 313 can be formed in a manner similar to that of the gate insulating layer 313 of the transistor 350. Thus, the gate insulating layer 313 can be a dense film, and generation of oxygen vacancies in its formation step can be inhibited. Further, oxygen contained in the oxide semiconductor layer can be inhibited from being released to the outside through the gate insulating layer 313 (generation of oxygen vacancies can be inhibited) after the gate insulating layer 313 is formed in a manufacturing process of the transistor 360. Thus, the transistor 360 has favorable electric characteristics.

Note that the transistor 360 in FIGS. 10A and 10B includes at least the gate electrode layer 317 on one side of the oxide semiconductor layer 340 with the gate insulating layer 313 provided therebetween. Alternatively, the transistor 360 may include a pair of gate electrode layers with the oxide semiconductor layer 340 provided therebetween. In the case where the transistor 360 includes a pair of gate electrode layers with the oxide semiconductor layer 340 provided therebetween, one of the gate electrode layers is connected to a signal line, and the other of the gate electrode layers (also referred to as a back gate) may be in a floating state (i.e., electrically isolated) or may be supplied with a potential. In the latter case, potentials with the same level may be supplied to the pair of gate electrode layers, or a fixed potential such as a ground potential may be supplied only to the back gate. By controlling the level of the potential supplied to the back gate, the threshold voltage of the oxide semiconductor transistor can be controlled. The oxide semiconductor transistor can easily be kept in a normally-off state through the control of the threshold voltage of the oxide semiconductor transistor.

Figure 11C:
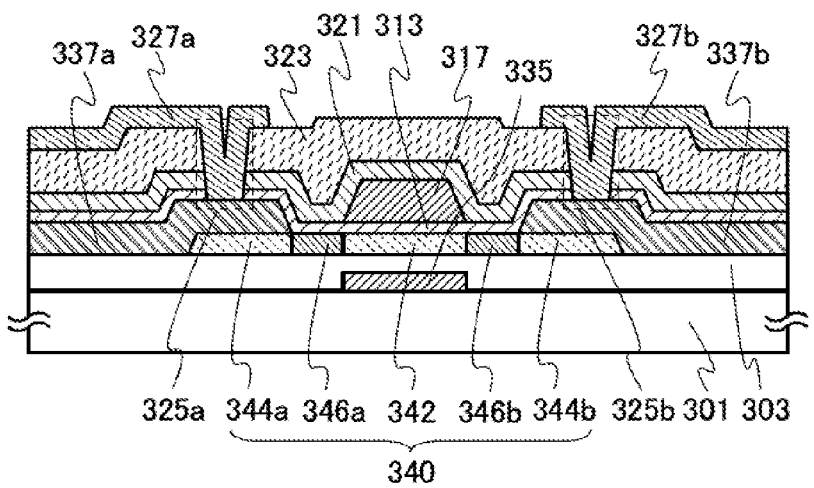

FIG. 11C illustrates an example in which another gate electrode layer 335 is provided on a side opposite to the gate electrode layer 317 side with respect to the oxide semiconductor layer 340 (i.e., the substrate 301 side) in the transistor 360 illustrated in FIG. 10B. The provision of the gate electrode layer 335 (back gate) facilitates the control of the threshold voltage of the transistor 360. In the case where the gate electrode layer 335 (back gate) is provided, the base insulating layer 303 also functions as a gate insulating layer.

Although the transistor 440a, the transistor 350, and the transistor 360 of this embodiment each have a top-gate structure, the present invention is not limited to the top-gate structure and a bottom-gate structure may be employed, for example.

<<Structure of Storage Device>>

Figure 7A:
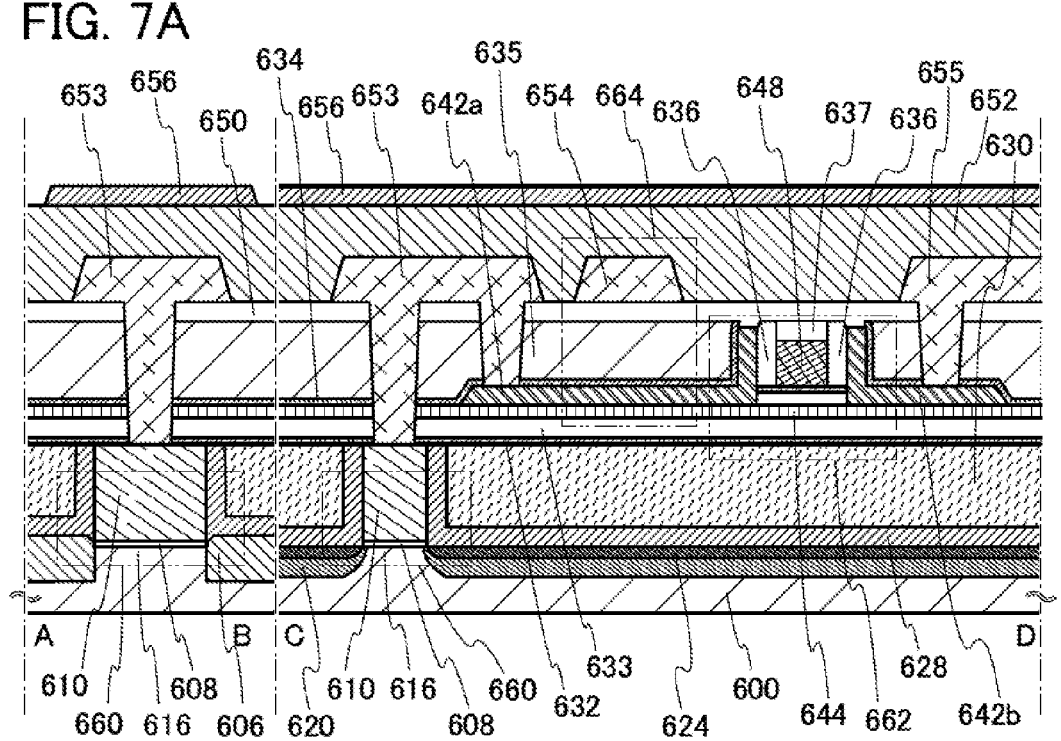
FIGS. 7A to 7C are a cross-sectional view, a plan view, and a circuit diagram of a storage device.
Figure 7B:
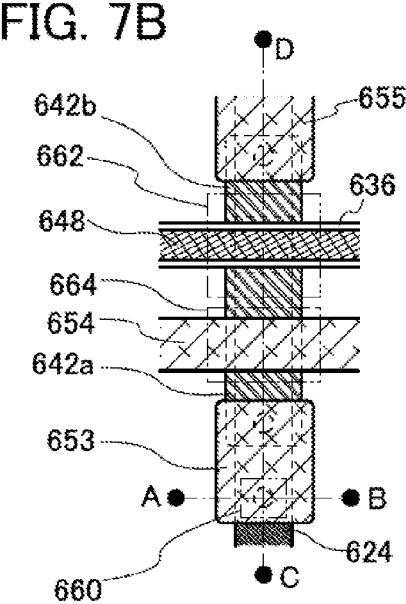
Figure 7C:
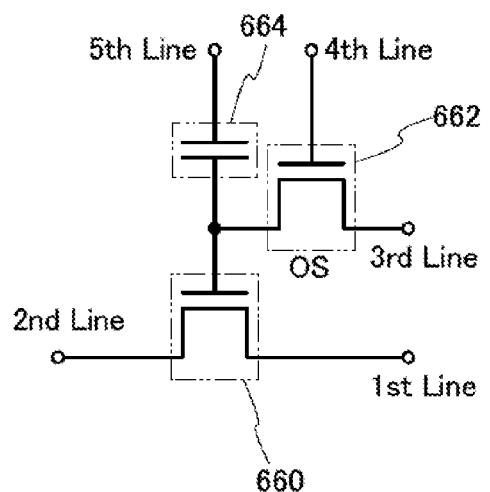

FIGS. 7A to 7C illustrate a structure of a storage device including the above oxide semiconductor transistor. FIGS. 7A to 7C illustrate a cross-sectional view, a plan view, and a circuit diagram, respectively, of the storage device. Here, FIG. 7A corresponds to a cross section along line A-B and line C-D in FIG. 7B. Note that in FIG. 7B, some components of the storage device illustrated in FIG. 7A are omitted. The storage device including the oxide semiconductor transistor is used as the cache memory 103.

The storage device illustrated in FIGS. 7A and 7B includes a transistor 660 including a first semiconductor layer in a lower portion, and a transistor 662 including a second semiconductor layer in an upper portion. In FIGS. 7A and 7B, the structure of the transistor 440a described above is applied to the transistor 662. Needless to say, the structure of the transistor 350 or the transistor 360 described above may be applied to the transistor 662.

Although the transistor 662 has a top-gate structure in the storage device illustrated in FIGS. 7A and 7B, the present invention is not limited to the top-gate structure and a bottom-gate structure may be employed, for example.

Here, the first semiconductor layer and the second semiconductor layer are preferably formed using semiconductor materials having different band gaps. For example, the first semiconductor layer may be a semiconductor layer other than an oxide semiconductor layer (e.g., a silicon layer) and the second semiconductor layer may be an oxide semiconductor layer. A transistor including a semiconductor layer other than an oxide semiconductor layer can operate at high speed easily. On the other hand, a transistor including an oxide semiconductor layer enables charge to be held for a long time owing to its characteristics.

Although all the transistors are n-channel transistors here, it is needless to say that p-channel transistors can be used. In addition, details of the storage device, such as materials for the storage device and the structure of the storage device, are not necessarily limited to those described here.

The transistor 660 in FIG. 7A includes a channel formation region 616 provided in a substrate 600 including a semiconductor layer which has a band gap different from that of an oxide semiconductor layer (e.g., a silicon layer), impurity regions 620 with the channel formation region 616 provided therebetween, intermetallic compound regions 624 in contact with the impurity regions 620, a gate insulating layer 608 provided over the channel formation region 616, and a gate electrode 610 provided over the gate insulating layer 608. Note that a transistor whose source electrode and drain electrode are not illustrated in a drawing may be referred to as a transistor for the sake of convenience. Further, in such a case, in description of a connection of a transistor, a source region and a source electrode are collectively referred to as a "source electrode," and a drain region and a drain electrode are collectively referred to as a "drain electrode". That is, in this specification, the term "source electrode" may include a source region.

An element isolation insulating layer 606 is provided over the substrate 600 to surround the transistor 660. An insulating layer 628 and an insulating layer 630 are provided to cover the transistor 660. Note that in the transistor 660, sidewall insulating layers may be formed on side surfaces of the gate electrode 610 and the impurity regions 620 may include regions having different impurity concentrations. Note that the element isolation insulating layer 606 can be formed by an element isolation technique such as local oxidation of silicon (LOCOS) or shallow trench isolation (STI).

The transistor 660 formed using a single crystal semiconductor substrate can operate at high speed. Thus, when the transistor is used as a reading transistor, data can be read at a high speed. As treatment prior to formation of the transistor 662 and a capacitor 664, CMP treatment is performed on two insulating layers formed to cover the transistor 660, whereby the insulating layer 628 and the insulating layer 630 which are planarized are formed and, at the same time, an upper surface of the gate electrode 610 is exposed.

For the insulating layer 628 and the insulating layer 630, typically, an inorganic insulating material such as silicon oxide, silicon oxynitride, aluminum oxide, aluminum oxynitride, silicon nitride, aluminum nitride, silicon nitride oxide, or aluminum nitride oxide can be used. The insulating layer 628 and the insulating layer 630 can be formed by a plasma CVD method, a sputtering method, or the like.

Alternatively, an organic material such as polyimide, an acrylic resin, or a benzocyclobutene-based resin can be used. Other than such organic materials, it is also possible to use a low-dielectric constant material (a low-k material) or the like. In the case of using an organic material, a wet process such as a spin coating method or a printing method may be used to form the insulating layer 628 and the insulating layer 630.

Note that in this embodiment, a silicon nitride film is used as the insulating layer 628, and a silicon oxide film is used as the insulating layer 630.

Planarization treatment is preferably performed on a surface of the insulating layer 630 which is to be the formation region of an oxide semiconductor layer 644. In this embodiment, the oxide semiconductor layer 644 is formed over the insulating layer 630 which is sufficiently planarized by polishing treatment such as CMP treatment (the average surface roughness of the surface of the insulating layer 630 is preferably less than or equal to 0.15 nm).

The transistor 662 illustrated in FIG. 7A includes an oxide semiconductor in the channel formation region. Here, the oxide semiconductor layer 644 included in the transistor 662 is preferably formed using an i-type or substantially i-type oxide semiconductor. By using an i-type oxide semiconductor, the transistor 662 which has extremely favorable off-state characteristics can be obtained.

In a manufacturing process of the transistor 662, electrode layers 642a and 642b which function as a source electrode layer and a drain electrode layer are formed in a step of removing a conductive layer provided over a gate electrode 648, an insulating layer 637, and sidewall insulating layers 636 by chemical mechanical polishing treatment.

Thus, in the transistor 662, the distance between the gate electrode 648 and a region (contact region) where the electrode layer 642a or 642b which functions as a source electrode layer or a drain electrode layer is in contact with the oxide semiconductor layer 644 can be shortened. Thus, the resistance between the gate electrode 648 and the region (contact region) where the electrode layer 642a or 642b is in contact with the oxide semiconductor layer 644 can be reduced, which results in an improvement in the on-state characteristics of the transistor 662.

Further, precise processing can be performed accurately because etching treatment with use of a resist mask is not performed in a step of removing the conductive layer over the gate electrode 648 for forming the electrode layers 642a and 642b. Consequently, in a process for manufacturing the storage device, a transistor having a miniaturized structure with less variation in shape or characteristics can be manufactured with high yield.

An interlayer insulating layer 635 and an insulating layer 650 each of which has a single-layer structure or a stacked structure are provided over the transistor 662. In this embodiment, an aluminum oxide layer is used as the insulating layer 650. When the aluminum oxide layer has high density (the film density is higher than or equal to 3.2 g/cm$^3$, preferably higher than or equal to 3.6 g/cm$^3$), the transistor 662 can have stable electric characteristics.

In addition, a wiring 654 is provided in a region overlapping with the electrode layer 642a of the transistor 662 with the interlayer insulating layer 635 and the insulating layer 650 provided therebetween, and the electrode layer 642a, the interlayer insulating layer 635, the insulating layer 650, and the wiring 654 form the capacitor 664. That is, the electrode layer 642a of the transistor 662 functions as one electrode of the capacitor 664, and the wiring 654 functions as the other electrode of the capacitor 664. Note that the capacitor 664 may be omitted if a capacitor is not needed. Alternatively, the capacitor 664 may be separately provided above the transistor 662.

A wiring 653, the wiring 654, and a wiring 655 can be formed in the same step. The electrode layer 642a and the gate electrode 610 are electrically connected to each other through the wiring 653. The wiring 653 electrically connects the electrode layer 642a to the gate electrode 610 through openings formed in the insulating layer 650, the interlayer insulating layer 635, the insulating layer 634, the oxide semiconductor layer 644, the insulating layer 632, and the insulating layer 633. Further, the wiring 655 is electrically connected to the electrode layer 642b through another opening formed in the insulating layer 650, the interlayer insulating layer 635, the insulating layer 634, the oxide semiconductor layer 644, the insulating layer 632, and the insulating layer 633. An i-type or substantially i-type oxide semiconductor used for the oxide semiconductor layer 644 has high resistance and thus can be substantially regarded as an insulator. Therefore, even when a side surface of the oxide semiconductor layer 644 is in contact with the wiring 653 or the wiring 655 in the opening, there is no concern that leakage current flows to a wiring or an electrode through the oxide semiconductor layer 644.

Figure 8A:
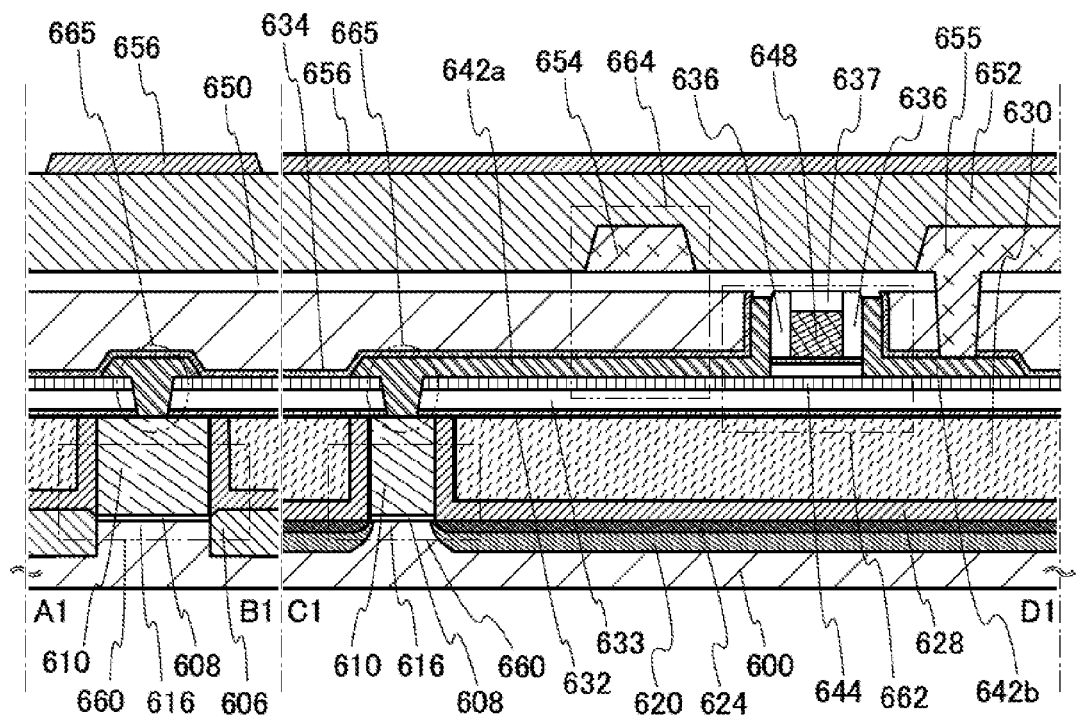
FIGS. 8A and 8B are a cross-sectional view and a plan view of a storage device.
Figure 8B:
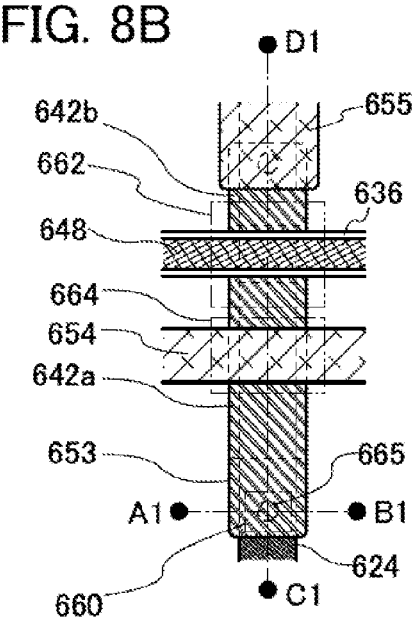

A structure may be employed in which an opening 665 is formed in the insulating layer 633 and the oxide semiconductor layer 644 before formation of the electrode layer 642a and the electrode layer 642b and the electrode layer 642a and the gate electrode 610 are directly connected to each other through the opening 665. FIG. 8A is a cross-sectional view of a semiconductor device having a structure in which the electrode layer 642a and the gate electrode 610 are directly connected to each other, and FIG. 8B is a plan view of the semiconductor device. FIG. 8A corresponds to a cross section along line A1-B1 and line C1-D1 in FIG. 8B. Note that in FIG. 8B, some components of the semiconductor device illustrated in FIG. 8A are omitted.

An insulating layer 652 is provided over the transistor 662 and the capacitor 664. Further, a wiring 656 may be provided over the insulating layer 652 as necessary. Although not illustrated in FIG. 7A and FIG. 8A, the wiring 656 may be electrically connected to the wiring 653 through an electrode formed in an opening provided in the insulating layer 652. Here, the electrode is preferably provided so as to partly overlap with at least the oxide semiconductor layer 644 of the transistor 662.

Alternatively, the wiring 656 may be electrically connected to the electrode layer 642a or the electrode layer 642b. Electrical connection between the wiring 656 and the electrode layer 642a or the electrode layer 642b may be established by direct contact of the wiring 656 and the electrode layer 642a or the electrode layer 642b or through an electrode provided in an insulating layer which is between the wiring 656 and the electrode layer 642a or the electrode layer 642b. Alternatively, the electrical connection may be established through a plurality of electrodes.

In FIGS. 7A and 7B, the transistor 660 and the transistor 662 are provided so as to at least partly overlap with each other. The source region or the drain region of the transistor 660 is preferably provided so as to overlap with part of the oxide semiconductor layer 644. Further, the transistor 662 and the capacitor 664 are provided so as to overlap with at least part of the transistor 660. For example, the wiring 654 of the capacitor 664 is provided so as to overlap with at least part of the gate electrode 610 of the transistor 660. With such a planar layout, the area occupied by the semiconductor device can be reduced; thus, higher integration can be achieved.

FIG. 7C illustrates an example of a circuit configuration corresponding to FIGS. 7A and 7B.

In FIG. 7C, a first wiring (1st Line) is electrically connected to a source electrode of the transistor 660. A second wiring (2nd Line) is electrically connected to a drain electrode of the transistor 660. A third wiring (3rd Line) is electrically connected to one of a source electrode and a drain electrode of the transistor 662. A fourth wiring (4th Line) is electrically connected to a gate electrode of the transistor 662. The gate electrode of the transistor 660 and the other of the source electrode and the drain electrode of the transistor 662 are electrically connected to the one electrode of the capacitor 664. A fifth wiring (5th line) is electrically connected to the other electrode of the capacitor 664.

The semiconductor device in FIG. 7C utilizes a characteristic in which the potential of the gate electrode of the transistor 660 can be held, and thus enables data writing, holding, and reading as follows.

Writing and holding of data will be described. First, the potential of the fourth wiring is set to a potential at which the transistor 662 is turned on, so that the transistor 662 is turned on. Accordingly, the potential of the third wiring is supplied to the gate electrode of the transistor 660 and the capacitor 664. That is, predetermined charge is given to the gate electrode of the transistor 660 (writing). Here, charge for supplying either of two different potential levels (hereinafter referred to as low-level charge and high-level charge) is given. After that, the potential of the fourth wiring is set to a potential at which the transistor 662 is turned off, so that the transistor 662 is turned off. Thus, the charge given to the gate electrode of the transistor 660 is held (holding). Note that the capacitance of the capacitor 664 and the resistance at the off-state of the transistor 662 (or the off-state current of the transistor 662) are major factors for determining the period for storing the charge. Also unintended leakage currents such as a gate leakage current of the transistor 660 can be factors to determine the period for storing the charge. For example, the capacitor 664 can store more than 90% of the initial charge even after one hour, under the condition of the capacitance of the capacitor 664 of $1 \times 10^{-15}$ F and the resistance at the off-state of the transistor 662 of $1 \times 10^{21}$ ohms.

Since the off-state current of the transistor 662 is extremely low, the charge of the gate electrode of the transistor 660 is held for a long time.

Then, reading of data will be described. By supplying an appropriate potential (reading potential) to the fifth wiring while a predetermined potential (constant potential) is supplied to the first wiring, the potential of the second wiring varies depending on the amount of charge held in the gate electrode of the transistor 660. This is because in general, when the transistor 660 is an n-channel transistor, an apparent threshold voltage $V_{th\_H}$ in the case where a high-level charge is given to the gate electrode of the transistor 660 is lower than an apparent threshold voltage $V_{th\_L}$ in the case where a low-level charge is given to the gate electrode of the transistor 660. Here, an apparent threshold voltage refers to the potential of the fifth wiring, which is needed to turn on the transistor 660. Thus, the potential of the fifth wiring is set to a potential $V_0$ that is between $V_{th\_H}$ and $V_{th\_L}$, whereby charge given to the gate electrode of the transistor 660 can be determined. For example, in the case where a high-level charge is given in writing, when the potential of the fifth wiring is set to $V_0$ ($>V_{th\_H}$), the transistor 660 is turned on. In the case where a low-level charge is given in writing, even when the potential of the fifth wiring is set to $V_0$ ($<V_{th\_L}$), the transistor 660 remains in an off state. Therefore, the data held can be read by the potential of the second wiring.

Note that in the case where memory cells are arrayed, only data of desired memory cells needs to be read. In the case where data is not read, a potential at which the transistor 660 is turned off regardless of the state of the gate electrode, that is, a potential lower than $V_{th\_H}$ may be supplied to the fifth wiring. Alternatively, a potential at which the transistor 660 is turned on regardless of the state of the gate electrode, that is, a potential higher than $V_{th\_L}$ may be supplied to the fifth wiring.

When a transistor having a channel formation region formed using an oxide semiconductor and having extremely low off-state current is applied to the storage device in this embodiment, the storage device can hold data for an extremely long period. In other words, power consumption can be sufficiently reduced because refresh operation becomes unnecessary or the frequency of refresh operation can be extremely low. Moreover, data can be held for a long period even when power is not supplied (note that a potential is preferably fixed).

Further, in the storage device described in this embodiment, high voltage is not needed for writing data and there is no problem of deterioration of elements. For example, unlike a conventional nonvolatile memory, it is not necessary to inject and extract electrons into and from a floating gate, and thus a problem such as deterioration of a gate insulating layer does not occur at all. In other words, the semiconductor device according to one embodiment of the disclosed invention does not have a limit on the number of times of writing, which is a problem in a conventional nonvolatile memory, and reliability thereof is drastically improved. Furthermore, since data is written depending on the on state and the off state of the transistor, high-speed operation can be easily achieved.

As described above, the oxide semiconductor transistor has a characteristic of extremely low off-state current. Thus, when the oxide semiconductor transistor is in an off state, electric charge (data) of a node which is electrically connected to one of the source and the drain of the oxide semiconductor transistor can be held for a long time.

A magnetic tunnel junction element (MTJ element) is known as a nonvolatile random access memory. The MTJ element stores data in a low-resistance state when the magnetization directions of ferromagnetic films provided above and below an insulating film are parallel, and stores data in a high-resistance state when the magnetization directions are anti-parallel. Thus, its operation principle is quite different from that of the memory including a wide band gap semiconductor material such as an oxide semiconductor material described in this embodiment. Table 1 shows comparison between the MTJ element and the semiconductor device according to this embodiment.

TABLE 1

|  | Spintronics (MTJ element) | OS/Si |
|---|---|---|
| 1) Heat Resistance | Curie temperature | Process temperature at 500° C. (reliability at 150° C.) |
| 2) Driving Method | Current driving | Voltage driving |
| 3) Writing Principle | Changing spin direction of magnetic body | Turning on/off FET |
| 4) Si LSI | Suitable for bipolar LSI (MOS LSI is preferable for high integration because bipolar LSI is unsuitable for high integration. Note that W becomes larger.) | Suitable for MOS LSI |
| 5) Overhead | Large (because of high Joule heat) | Smaller than overhead of the MTJ element by 2 to 3 or more orders of magnitude (because of charging and discharging of parasitic capacitance) |
| 6) Nonvolatility | Utilizing spin | Utilizing low off-state current |
| 7) Read Number | No limitation | No limitation |
| 8) 3D Structure | Difficult (at most two layers) | Easy (the number of layers is limitless) |
| 9) Integration Degree ($F^2$) | 4 $F^2$ to 15 $F^2$ | Depends on the number of layers stacked in 3D structure (it is necessary to ensure heat resistance in process of forming upper OS FET) |
| 10) Material | Magnetic rare-earth element | OS material |
| 11) Cost per Bit | High | Low (might be slightly high depending on OS material (e.g., In)) |
| 12) Resistance to Magnetic Field | Low | High |
| 13) Amount of Electirc Power Consumed for Writing Operation | 250 fJ/bit | 0.6 fJ/bit |

The MTJ element has a disadvantage in that, because a magnetic material is used, a magnetic property is lost when the temperature is higher than or equal to the Curie temperature. Further, the MTJ element is driven by current and thus is compatible with a silicon bipolar device; however, a bipolar device is unsuitable for high integration. Further, there is a problem in that power consumption is increased by an increase of memory capacity, though the writing current of the MTJ element is extremely low.

In principle, the MTJ element has low resistance to a magnetic field, so that the magnetization direction is likely to change when the MTJ element is exposed to a high magnetic field. In addition, it is necessary to control magnetic fluctuation which is caused by nanoscaling of a magnetic body used for the MTJ element.

In addition, a rare earth element is used for the MTJ element; thus, it requires special attention to incorporate a process of forming the MTJ element in a process of forming a silicon semiconductor that avoids metal contamination. Further, the material cost per bit of the MTJ element is expensive.

On the other hand, the above-described transistor which includes a wide band gap semiconductor material such as an oxide semiconductor material has an element structure and an operation principle similar to those of a silicon MOSFET except that a semiconductor material for forming a channel is a metal oxide. Further, the transistor including an oxide semiconductor is not affected by a magnetic field, and does not cause soft errors. This shows that the transistor is highly compatible with a silicon integrated circuit.

As shown in Table 1, the memory in which the transistor including a wide band gap semiconductor material such as an oxide semiconductor material and the transistor including silicon are combined, which is described above, has advantages over a spintronics device in many aspects such as the heat resistance, the three-dimensional structure (stacked-layer structure of three or more layers), the resistance to a magnetic field, and the amount of electric power consumed for writing operation. Note that the power for overhead shown in Table 1 is, for example, power for writing data into a memory section or the like in a processor, which is what is called power consumed for overhead.

As described above, the use of the memory including an oxide semiconductor, which has more advantages than the spintronics device makes it possible to reduce power consumption of a storage system.

In the case where a storage device including an oxide semiconductor transistor is used as a cache memory, power supply is not needed when the oxide semiconductor transistor is in an off state, which removes the necessity of always supplying power to the cache memory. Thus, a storage system which includes a cache memory needless of replacement of a power storage device can be provided.

Further, as described above, another writing operation (refresh operation) at predetermined intervals is unnecessary in the case of using an oxide semiconductor transistor. Thus, a storage system which includes a cache memory with low power consumption can be provided.

In a memory including an oxide semiconductor transistor, a gate insulating layer of a storage element does not deteriorate as in a flash memory, which removes the upper limit on the number of writing operations. Thus, by using a memory including an oxide semiconductor transistor as a cache memory, a storage system which has no limitation on the number of writing operations can be provided.

As described above, in this embodiment, a storage device including an oxide semiconductor transistor is used as a cache memory, whereby a storage system which includes a cache memory needless of replacement of a power storage device can be provided.

Further, according to this embodiment, a storage system which includes a cache memory with low power consumption can be provided.

Furthermore, according to this embodiment, a storage system which includes a cache memory having no limitation on the number of rewriting operations can be provided.

This application is based on Japanese Patent Application serial no. 2012-077834 filed with Japan Patent Office on Mar. 29, 2012, the entire contents of which are hereby incorporated by reference.

What is claimed is:

1. A controller configured to store data in any of a plurality of storage devices, the controller comprising:
a processor configured to specify at least one of the plurality of storage devices where the data is to be stored; and
a cache memory configured to store the data and output the data to the at least one of the plurality of storage devices, the cache memory comprising:
a first transistor including a first semiconductor;
a second transistor including a second semiconductor layer having a band gap different from that of the first semiconductor; and
a capacitor electrically connected to the first transistor and the second transistor,
wherein the cache memory stores the data for one hour or more without power supply.

2. The controller according to claim 1, wherein the cache memory comprises a storage circuit including a transistor including an oxide semiconductor layer.

3. The controller according to claim 1, wherein the plurality of storage devices are hard disks.

4. The controller according to claim 1, wherein the first semiconductor is an oxide semiconductor and the second semiconductor is silicon.

5. The controller according to claim 1,
wherein the first transistor comprises a pair of insulators,
wherein the pair of insulators sandwich a gate electrode of the first transistor,
wherein the first transistor comprises a pair of conductors,
wherein one of the pair of conductors works as a source electrode of the first transistor and the other of the pair of conductors works as a drain electrode of the first transistor, and
wherein the pair of conductors sandwich the pair of insulators and the gate electrode of the first transistor.

6. The controller according to claim 5, wherein the first transistor comprises a third insulator over the gate electrode of the first transistor and between the pair of insulators.

7. A storage system comprising:
a plurality of storage devices; and
a controller configured to store data externally input in any of the plurality of storage devices, the controller comprising:
a processor configured to specify at least one of the plurality of storage devices where the data is to be stored; and
a cache memory configured to store the data and output the data to the at least one of the plurality of storage devices, the cache memory comprising:
a first transistor including a first semiconductor;
a second transistor including a second semiconductor layer having a band gap different from that of the first semiconductor; and
a capacitor electrically connected to the first transistor and the second transistor,
wherein the cache memory stores the data for one hour or more without power supply.

8. The storage system according to claim 7, wherein the cache memory comprises a storage circuit including a transistor including an oxide semiconductor layer.

9. The storage system according to claim 7, wherein the plurality of storage devices are hard disks.

10. The storage system according to claim 7, wherein the first semiconductor is an oxide semiconductor and the second semiconductor is silicon.

11. The storage system according to claim 7,
wherein the first transistor comprises a pair of insulators,
wherein the pair of insulators sandwich a gate electrode of the first transistor,
wherein the first transistor comprises a pair of conductors,
wherein one of the pair of conductors works as a source electrode of the first transistor and the other of the pair of conductors works as a drain electrode of the first transistor, and
wherein the pair of conductors sandwich the pair of insulators and the gate electrode of the first transistor.

12. The storage system according to claim 11, wherein the first transistor comprises a third insulator over the gate electrode of the first transistor and between the pair of insulators.

* * * * *